United States Patent [19]
Jeanneret et al.

[11] Patent Number: 5,632,352
[45] Date of Patent: May 27, 1997

[54] ELECTRIC TRACTION MOTOR VEHICLE

[75] Inventors: René Jeanneret, Merzligen; Thomas Edye, Boudry; Jacques Müller, Reconvilier, all of Switzerland

[73] Assignee: SMH Management Services AG, Switzerland

[21] Appl. No.: 379,474

[22] PCT Filed: May 24, 1994

[86] PCT No.: PCT/IB94/00119

§ 371 Date: Mar. 21, 1995

§ 102(e) Date: Mar. 21, 1995

[87] PCT Pub. No.: WO94/27837

PCT Pub. Date: Dec. 8, 1994

[30] Foreign Application Priority Data

Jun. 2, 1993 [FR] France ................................. 93 06690

[51] Int. Cl.⁶ ........................ B60K 1/00; B60K 5/08
[52] U.S. Cl. ................. 180/65.2; 180/65.4; 290/17
[58] Field of Search ........................... 180/65.1, 65.2, 180/65.3, 65.4; 290/14, 16, 17; 320/62

[56] References Cited

U.S. PATENT DOCUMENTS 4,306,156 12/1981 Monaco et al. ..................... 180/65.2
4,533,011 8/1985 Heidemeyer et al. ............... 180/65.2
5,214,358 5/1993 Marshall ............................. 180/55.4

FOREIGN PATENT DOCUMENTS 29 43 554  5/1981  Germany.

*Primary Examiner*—Richard M. Camby
*Attorney, Agent, or Firm*—Pollock, Vande Sande & Priddy

[57] ABSTRACT

The vehicle (1) comprises a driving wheel (2) driven by an electric motor (3) whose control circuit (4) is supplied by a generator (6) coupled to a fuel engine (5), and a sensor (18) supplying a power-setting control signal (SC) representative of the position of an accelerator pedal (17) and hence of the desired power that the electric motor (3) has to supply to the wheel (2). To avoid having to provide the vehicle (1) with a large capacity traction battery, the vehicle further comprises means (7, 14 to 16, 19, 20) responsive to the power setting signal (SC) to regulate the rotational speed of the fuel engine (5) to the value at which the latter supplies a mechanical power (Pm) that is equal, firstly, to the desired power and, secondly, to a predetermined fraction of its maximum power.

13 Claims, 10 Drawing Sheets

Fig. 2

| | SI1 | SI2 | 9 | 12 |
|---|---|---|---|---|
| SR < SC | 1 | 1 | –o̸ o– | –o̸ o– |
| SR = SC | 1 | 2 | –o̸ o– | –o–o– |
| SR > SC | 2 | 2 | –o–o– | –o–o– |

Fig. 7

| | SI3 | SI4 | SI5, SD | 58 | 59 | 60 | SM |
|---|---|---|---|---|---|---|---|
| SR < SC | 1 | 1 | 2 | –o̸ o– | –o̸ o– | –o–o– | SM3 |
| SR = SC | 2 | 1 | 1 | –o–o– | –o̸ o– | –o̸ o– | SM1 |
| SR > SC | 1 | 2 | 1 | –o̸ o– | –o–o– | –o̸ o– | SM2 |

ELECTRIC TRACTION MOTOR VEHICLE

FIELD OF THE INVENTION

The present invention relates to a motor vehicle comprising:

- a fuel engine for producing a first mechanical power;
- a generator for converting said first mechanical power into a first electrical power;
- control means operable by a driver of said vehicle to produce a power setting signal representative of a desired power;
- a driving wheel; and
- motor means for supplying a second mechanical power to said driving wheel from a second electrical power, said motor means including an electric motor mechanically coupled is said driving wheel and a circuit for controlling said electric motor that is responsive to said power setting signal to regulate the value of said second mechanical power to the value of said desired power.

BACKGROUND OF THE INVENTION

Motor vehicles having the above features, such as those described for instance in patents U.S. Pat. No. 4,306,156 and DE-C-2,943,554, further comprise a battery of accumulators that supplies most of the time the energy consumed by their electric motor. The fuel engine of these known vehicles is only put into operation when the amount of energy available in the battery drops below a predetermined value. The fuel engine then supplies via the generator coupled thereto the energy consumed by the electric motor and that required to recharge the battery. When the amount of energy available in the battery reaches another predetermined value, greater than the preceding predetermined value, the fuel engine is stopped. The energy consumed by the electric motor is then again supplied solely by the battery. U.S. Pat. No. DE-C-2,943,554 further provides for the electric motor to be operated as a generator to brake the vehicle, the electrical energy thus produced being fed to the battery inasfar as the latter is not already fully charged.

A vehicle such as those that have just been described suffer from many drawbacks caused by the battery of accumulators with which it is provided.

Thus, for example, such a battery has a large mass, generally greater than 100 kilograms and sometimes even several hundreds of kilograms, thereby increasing the unladen mass of the vehicle provided with this battery and hence reducing the overall efficiency of the latter, i.e. the distance it can travel, all else being equal, with a given amount of energy.

Besides, such a battery has a very large volume, thereby reducing the ratio between the useful internal volume of the vehicle in which it is installed and the total volume of the latter.

Further, the cost of such a battery is high, therefor increasing the cost price of the vehicle, and its life is limited, thereby having to replace it periodically and hence increasing the maintenance costs of the vehicle.

Moreover, the large mass and large volume of such a battery give rise to serious problems as regards its installation in the vehicle, these problems being further complicated by the fact that this battery needs to be readily accessible for maintenance and/or replacement purposes, problems that can only be resolved by resorting to rather complex means whose cost still further increases the cost price of the vehicle.

It should be added that such batteries are a serious hazard for the environment in the event of an accident to the vehicle because of the large amount of polluting materials, such as lead, sulphuric acid or potassium hydroxide, they contain.

SUMMARY OF THE INVENTION

An object of the present invention is to provide a vehicle of the same kind as the above-described known vehicles, but which does not suffer from their drawbacks, i.e. a vehicle which, all other things being equal, has a lesser mass than that of known vehicles and hence a higher overall efficiency than the latter, a cost price and maintenance costs that are also less than those of known vehicles, the vehicle according to the present invention further having a better useful volume to total volume ratio than those known vehicles and being much lesser an environmental hazard than these known vehicles in case of an accident.

This object is achieved by the claimed motor vehicle which comprises:

- a fuel engine for producing a first mechanical power;
- a generator for converting said first mechanical power into a first electrical power;
- control means operable by a driver of said vehicle to produce a power setting signal representative of a desired power;
- a driving wheel; and
- motor means for supplying a second mechanical power to said driving wheel from a second electrical power, said motor means including an electric motor mechanically coupled to said driving wheel and a circuit for controlling said electric motor that is responsive to said power setting signal to adjust the value of said second mechanical power to the value of said desired power;
- and which is characterized in that said vehicle further comprises adjustment means responsive to said power setting signal to adjust the rotational speed of said fuel engine to the value at which said first mechanical power is at least substantially equal, firstly, to said desired power and, secondly, to a predetermined fraction of said fuel engine's maximum mechanical power, said adjustment means including transfer means that are electrically coupled to said generator and to said motor means to produce said second electrical power from said first electrical power.

As will be shown further on, these characteristic features enable the vehicle according to the present invention to comprise, at least in some embodiments, no battery of accumulators such as the one that supplies to the electric motor of the known vehicles the electrical energy needed for their operation. Those characteristic features also enable the vehicle according to the invention to only comprise, in other embodiments, a battery of accumulators of considerably smaller capacity than that in the known vehicles.

These characteristic features of the vehicle according to the invention thus make it possible to fully eliminate or at least considerably reduce the above-mentioned drawbacks which are associated, is the known vehicles, with the presence of a battery of accumulators of large capacity.

BRIEF DESCRIPTION OF THE DRAWINGS

Other objects and advantages of the present invention will become evident from the following description of some of its embodiments with reference to the accompanying drawings, wherein:

FIG. 2 is a table summarizing the operation of some of the components of the vehicle of FIG. 1;

FIG. 7 is a table summarizing the operation of some of the components of the vehicle of FIG. 5;

DETAILED DESCRIPTION OF THE INVENTION

Figure 1:
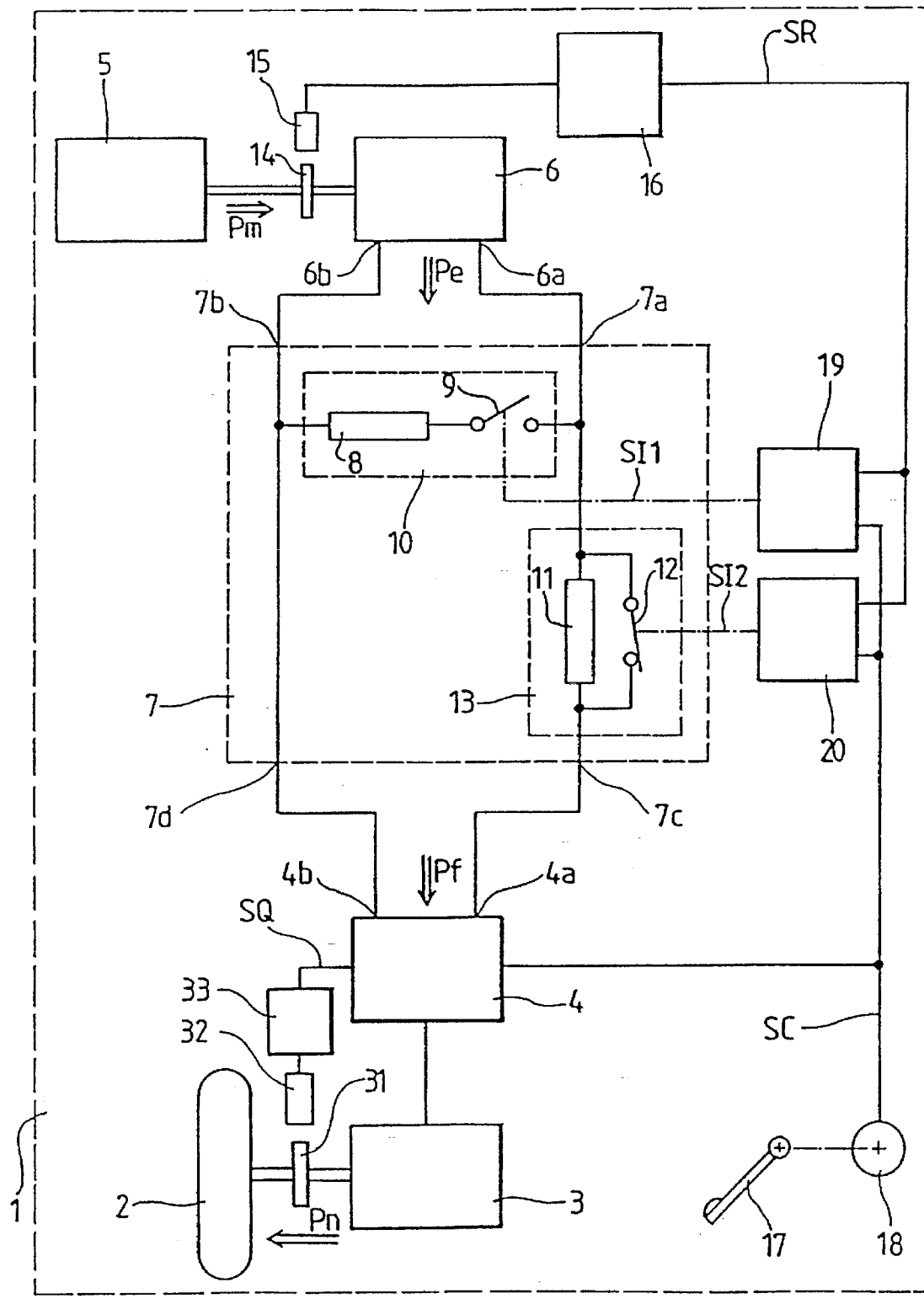
FIG. 1 is a diagrammatic and partial representation, by way of non-limiting example, of an embodiment of the vehicle according to the invention.

In the embodiment that is diagrammatically and partially represented in FIG. 1, the vehicle according to the present invention, generally referenced 1, comprises a driving wheel 2 that is mechanically connected to the rotor, not shown separately, of an electric motor 3. Motor 3 may be of the same kind as any one of the various well-known electric motors that can be used to drive a driving wheel of a vehicle and will therefore not be described in greater detail.

In FIG. 1, wheel 2 and motor 3 have been shown separately and their mechanical linkage has been symbolized by a double line. But it is clear that wheel 2 and motor 3 may be coupled side by side to one another. Also, the linkage between wheel 2 and the rotor of motor 3 may be direct, as shown, or via a gear train or any other similar arrangement.

Vehicle 1 further comprises a device for supplying a measurement signal SQ representative of the rotational speed of motor 3. This device may comprise, as shown in FIG. 1, a disk 31 concentrically fixed to the shaft connecting motor 3 to wheel 2, a photo-electric or magnetic sensor 32 producing pulses in response to teeth or holes, not shown, regularly arranged at the periphery of disk 31 and travelling past the sensor, and an electronic circuit 33 supplying the signal SQ in response to the pulses produced by sensor 32. These various components of the device for measuring the rotational speed of motor 3 will not be described in greater detail as they are well-known to specialists. This measuring device may moreover be constructed in many other ways that are also well-known.

The vehicle 1 further comprises a control circuit 4 for transmitting to motor 3, in a form adapted to the nature of the latter, electrical energy it receives in a manner that will be explained further on.

Control circuit 4 will not be described in detail as its structure obviously depends on the nature of motor 3 and on the form in which it receives the electrical energy mentioned above. Suffice it to say that control circuit 4 comprises, in the present example, a pair of input terminals 4a and 4b, and that it is adapted to regulate the electrical power it supplies to motor 3 in dependence on the value of a power setting signal SC it receives from a device described hereafter and on the value of the signal SQ representative of the rotational speed of motor 3.

In FIG. 1, the link between control circuit 4 and motor 3 is symbolized by a simple line although it is obviously made up of several conductors whose number is equal to at least two and depends on the nature of motor 3.

The vehicle 1 moreover comprises a fuel engine 5, i.e. an engine producing mechanical energy in response to the combustion of a fuel. Such an engine may, for instance, be a gasoline engine, a diesel engine, a gas turbine, etc.

The output shaft of engine 5 is connected to the rotor, not shown separately, of an electrical energy generator 6 by a mechanical link symbolized by a double line.

Engine 5 and generator 6 have also been shown separately, but they may of course be coupled side by side to one another. Also, the mechanical linkage between the output shaft of engine 5 and the rotor of generator 6 may be direct, as shown, or via a gear train or any other similar arrangement.

The stator of generator 60 which has not been shown separately either, comprises in the present example a pair of output terminals 6a and 6b. As will be made clear further on, the voltage produced by generator 6 across terminals 6a and 6b when motor 5 drives its rotor may be d.c. or a.c., the control circuit 4 of motor 3 being of course suitably adapted.

The electrical power supplied by generator 6 is transferred to control circuit 4 by a power regulating circuit 7 having a pair of input terminals 7a and 7b respectively connected to the terminals 6a and 6b of generator 6 and a pair of output terminals 7c and 7d respectively connected to the terminals 4a and 4b of the control circuit 4 of electric motor 3.

Regulating circuit 7 includes a first resistor 8 and a first switch 9 connected in series with one another and together forming a first regulating element 10 connected in parallel across terminals 7a and 7b.

Regulating circuit 7 includes also a second resistor 11 and a second switch 12 connected in parallel with one another and together forming a second regulating element 13 connected in series across terminals 7a and 7c.

Moreover, terminals 7b and 7d of regulating circuit 7 are directly connected to one another.

Switches 9 and 12 have been shown in FIG. 1 in the form of simple contacts but obviously they preferably consist of electronic elements such as transistors or thyristors.

In whatever manner they are made, switches 9 and 12 are respectively controlled by signals SI1 and SI2 that can each take two separate states, and they are arranged to be open or closed according to whether their respective control signal SI1 or SI2 is in its first or second state.

Thus, in the FIG. 1 situation, signal SI1 is in its first state and switch 9 is open, and signal SI2 is in its second state and switch 12 is closed.

Signals SI1 and SI2 are produced by circuits that will be described further on and are respectively applied to switches 9 and 12 by linkages symbolized by chain-dotted lines.

The vehicle 1 further comprises a device supplying a measurement signal SR that is representative of the rotational speed R of fuel engine 5. This device may include, as shown in FIG. 1, a disk 14 concentrically fixed to the shaft connecting engine 5 to generator 6, a photo-electric or magnetic sensor 15 producing pulses in response to teeth or holes, not shown separately, regularly arranged at the periphery of disk 14 and travelling past the sensor, and an electronic circuit 16 supplying signal SR in response to the pulses produced by sensor 15. These various components of the device for measuring the rotational speed R of engine 5 will not be described in greater detail as they are well-known to specialists. This device can moreover be constructed in numerous other ways that are also well-known.

Suffice it to say here that this device for measuring the rotational speed R of engine 5 is arranged for the signal SR to have a minimum value SRm when engine 5 rotates at its minimum speed, this being the speed below which it is liable to stoll and at which the mechanical power it supplies is practically nil, and for the signal SR to have a maximum value SRM when engine 5 rotates at its maximum speed, i.e. the speed that it must not exceed for fear of damage.

The vehicle 1 furthermore comprises an accelerator pedal 17, similar to the accelerator pedal of a conventional vehicle, which is mechanically connected, by a linkage symbolized by a chain-dotted line, to a sensor 18 supplying a signal SC representative of the position of pedal 17. Signal SC is the one mentioned earlier in describing the control circuit 4 of motor 3.

Sensor 18 will not be described in detail as it is a well-known element that can moreover be constructed in a variety of ways. Suffice it to say here that sensor 18 is arranged for signal SC to have a minimum value SCm when pedal 17 is in the position it takes up when the driver of vehicle 1 does not touch it and for signal SC to have a maximum value SCM when the driver of vehicle 1 presses pedal 17 against its end of run abutment.

For a reason that will be made clear further on, it is necessary for the device for measuring the rotational speed R of engine 5 and for sensor 18 to be so arranged that signals SR and SC are of the same nature. For example, each of these two signals may consist of an electrical voltage. It is also necessary for this device and for this sensor to be so arranged that the minimum values SRm and SCm of signals SR and SC are at least substantially equal, as also the maximum values SRM and SCM of signals SR and SC. It is moreover preferable but not mandatory for signal SC to vary at least substantially linearly between its minimum value SCm and its maximum value SCM in dependence on the position of accelerator pedal 17.

The above-mentioned signals SI1 and SI2, which are the control signals for switches 9 and 12, are respectively produced by a first comparator circuit 19 and by a second comparator circuit 20. Comparators 19 and 20 each have a first input connected to circuit 16 and thereby receiving signal SR, a second input connected to sensor 18 and thereby receiving signal SC, and an output supplying signal SI1 or, respectively, SI2.

Comparator circuit 19 is so arranged that signal SI1 is in its first state when the value of signal SR is less than or equal to that of signal SC, and that signal SI1 is in its second state when the value of signal SR is greater than that of signal SC.

Comparator circuit 20 is so arranged that signal SI2 is in its first state when the value of signal SR is less than that of signal SC, and that signal SI2 is in its second state when the value of signal SR is greater than or equal to that of signal SC.

This operation of comparators 19 and 20 is summarized in the table of FIG. 2 which indicates the states of switches 9 and 12 in the three possible cases, i.e. in the cases where signal SR is respectively less than, equal to or greater than signal SC. In this table, numerals 1 and 2 indicate whether the signal whose reference appears at the top of the column is in its first or second state.

Comparators 19 and 20 will not be described in greater detail as such circuits are well-known to specialists. Moreover, their construction obviously depends on the nature of the signals SR and SC they receive on their inputs and on the nature of the signals SI1 and SI2 they have to supply to switches 9 and 12 to open or close them.

Before beginning to describe the operation of vehicle 1, it should be recalled that, in any motor vehicle, of whatever kind, the mechanical power supplied by the traction motor is regulated, by appropriate means whose nature depends on that of this motor, to a desired value that is determined by the position of the vehicle's accelerator pedal. In other words, to each position of the accelerator pedal there corresponds a desired mechanical power, and the means for regulating the mechanical power supplied by the motor so act on the latter that the mechanical power it effectively supplies becomes or remains equal to this desired mechanical power. In the case of the vehicle 1, each value of signal SC, that is representative of the position of accelerator pedal 17, thus corresponds to a particular value of a desired mechanical power which will be referenced Pc, and the mechanical power supplied by motor 3 to wheel 2 is regulated, as will be described further on, in a manner such that its value becomes or remains equal to this value of the desired mechanical power Pc, whatever may be this latter value.

For a reason which will become clear below, the device, not shown separately, which supplies engine 5 with fuel and possibly a combustive agent is so arranged, in the present example, that engine 5 always produces the maximum power it can produce at the speed at which it rotates whatever that latter speed. Thus in the case where fuel engine 5 is a gasoline engine supplied by a conventional carburetor, this condition is fulfilled by blocking the carburetor's throttle valve in its fully open position or by doing away with this throttle valve all together.

Figure 3:
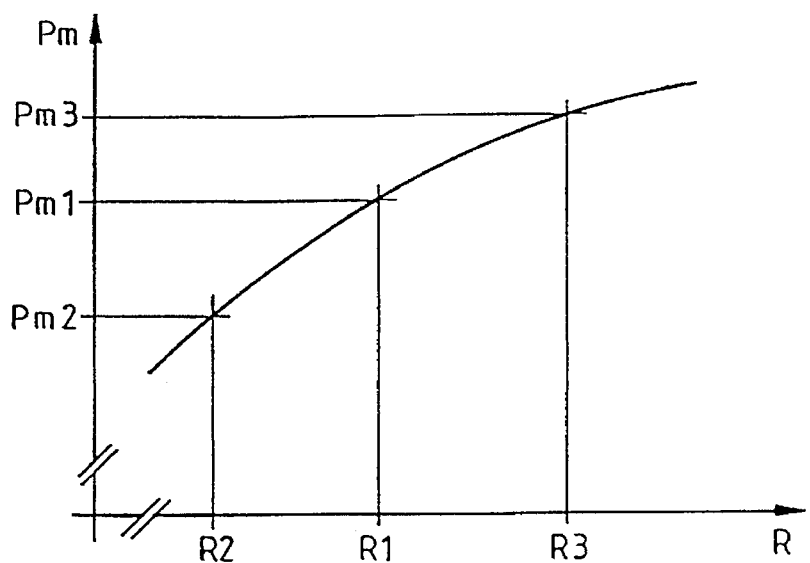
FIG. 3 is a graph diagrammatically representing the maximum mechanical power supplied by a fuel engine in dependence on its rotational speed.

FIG. 3 diagrammatically illustrates the well-known variation of the mechanical power Pm produced under these conditions by engine 5 in dependence on its rotational speed R. It should be noted that, since the mechanical power Pm produced by engine 5 is always equal to the maximum mechanical power it can produce, whatever its rotational speed R, the signal SR representative of this rotational speed R is also representative of power Pm.

For another reason, which will also be made clear below, the device for measuring the rotational speed R of engine 5, formed in the present example by disk 14, sensor 15 and electronic circuit 16, is preferably so arranged that signal SR, which, as has just been shown, is also representative of the mechanical power Pm supplied by engine 5, varies at least substantially linearly between its minimum value SRm and its maximum value SRM in dependence on power Pm.

The mechanical power Pm produced by fuel engine 5 when vehicle 1 is moving is converted into electrical power by generator 6. This latter electrical power, which will hereinafter be termed electrical power Pe, is transmitted to control circuit 4 of motor 3, totally or partially as will be seen latter, by regulation circuit 7. The electrical power that is transmitted by the latter to control circuit 4 shall hereinafter be termed electrical power Pf. Electrical power Pf is transmitted to motor 3, by control circuit 4, in a form suited to the nature of motor 3, and is converted by the latter into mechanical power, hereinafter termed mechanical power Pn. Mechanical power Pn is obviously used by driving wheel 2 to move vehicle 1 forward. Powers Pm, Pe, Pf and Pn have been symbolized by arrows in FIG. 1.

Part of mechanical power Pm is dissipated in generator 6 so that the electric power Pe supplied by the latter has a slightly lesser value than that of mechanical power Pm.

Similarly, part of electrical power Pf supplied by regulating circuit 7 to control circuit 4 is dissipated in the latter and in electric motor 3, so that the mechanical power Pn produced by the latter has a slightly lesser value than that of electrical power Pf.

But these powers that are dissipated during these conversions are generally slight compared to the mechanical power Pm supplied by engine 5 and, respectively, compared to the electrical power that is absorbed by motor 3, so that they shall be neglected in the following description of the operation of vehicle 1. A specialist will have no difficulty in dimensioning the various elements of vehicle 1 to take into account, if necessary, these powers being dissipated in generator 6, in control circuit 4 and in motor 3.

So as not unnecessarily to complicate the following description of the operation of vehicle 1, it will be assumed therefore in this description that the electrical power Pe supplied by generator 6 is equal to the mechanical power Pm produced by fuel engine 5, and that the mechanical power Pn supplied by electric motor 3 to driving wheel 2 is equal to the electrical power Pf that the control circuit 4 of motor 3 receives from regulating circuit 7.

It will further be assumed that, at the start of this description of the operation of vehicle 1, signal SC has a value SC1 somewhere between its minimum value SCm and its maximum value SCM, and that this value SC1 has not varied for some time. This value SC1 of signal SC corresponds to a value PC1 of the desired power Pc, i.e. the mechanical power Pn that electric motor 3 is required to supply to wheel 2.

Under these conditions, and as will be made clear further on, fuel engine 5 rotates at a speed R1 which happens to be that at which the value PM1 of the mechanical power Pm it produces is equal to the value PC1 of the desired power Pc.

The value SR1 of signal SR corresponding to this rotational speed R1 of engine 5 and to this mechanical power PM1 is thus equal to the value SC1 of signal SC.

The signal SI1 produced by comparator 19 is thus in its first state, so that switch 9 is open, whereas the signal SI2 produced by comparator 20 is in its second state, so that switch 12 is closed. The regulating circuit 7 is thus in the state shown in FIG. 1 wherein resistor 8 is not connected and resistor 11 is short-circuited.

The value Pf1 of the electrical power Pf supplied by regulating circuit 7 to control circuit 4 is thus equal to the value Pe1 of the electrical power Pe produced by generator 6, which value is itself equal to the value Pm1 of the mechanical power Pm produced by engine 5, and hence to the value PC1 of the desired power Pc.

It follows that the value Pn1 of the mechanical power supplied by electric motor 3 is also equal to the value PC1 of the desired mechanical power Pc.

It should be noted that, in this situation, the driving torque created by fuel motor 5 is equal to the braking torque created by generator 6, so that the rotational speed R of motor 5 remains constant.

This situation remains unchanged as long as the driver of vehicle 1 does not modify the position of pedal 17 and the value of signal SC thus remains equal to SC1.

When the driver of vehicle 1 decreases, for example, the pressure he is exerting on pedal 17, signal SC assumes a new value SC2 less than the value SC1 it had previously and corresponding to a new value Pc2 of the desired power Pc, also less than the previous value PC1 of that desired power Pc.

As will be made clear further on, this diminution of signal SC has no immediate effect on the rotational speed R of fuel engine 5, and hence on the value of signal SR which remains equal to SR1. Signal SC is thus now less than signal SR, so that comparator circuit 19 puts signal SI1 in its second state, thereby causing switch 9 to close. On the other hand, comparator circuit 20 does not modify signal SI2, which remains in its second state, switch 12 thus remaining closed.

The closure of switch 9 causes resistor 8 to be connected in parallel with generator 6 and control circuit 4, and hence to increase the braking resistance created by generator 6, which resistance becomes greater than the driving torque created by fuel engine 5.

The rotational speed R of engine 5 and the mechanical power Pm it supplies thus diminish all the faster when the value of resistor 8 is low.

When rotational speed R reaches value R2 at which signal SR has a value SR2 equal to the new value SC2 of signal SC, comparator circuit 19 restores to signal SI1 its first state, so that switch 9 again opens and the connection of resistor 8 to generator 6 is interrupted.

Further, the value Pm2 of the mechanical power Pm supplied by engine 5 is now equal to the new value Pc2 of desired power Pc since the value SR2 of signal SR is now equal to the value SC2 of signal SC.

Since, in addition, switch 9 is now open and switch 12 is still closed, vehicle 1 is in a stable situation similar to that described above, i.e. a situation in which powers Pm, Pe, Pf and Pn are all equal to the desired power Pc determined by the position of pedal 17, the only difference between these two situations being the value of the desired power Pc and hence of the powers Pm, Pe, Pf and Pn.

This situation remains unchanged as long as the driver of vehicle 1 does not modify the position of pedal 17.

If the conductor of vehicle 1 then increases, still by way of example, the pressure he is exerting on pedal 17, signal SC takes on a new value SC3 which is greater than the previous value SC2 and which corresponds to a new value Pc3 of the desired power Pc, which is also greater than the previous value Pc2 of desired power Pc.

This increase in signal SC has no immediate effect either on the rotational speed R of fuel engine 5, and the value of signal SR thus remains equal to SR2.

Signal SC is thus now greater than signal SR, so that comparator circuit 20 puts signal SI2 in its first state, thereby causing switch 12 to open. On the other hand, comparator signal 19 does not modify signal SI1, which remains in its first state, switch 9 thus remaining open.

The opening of switch 12 has the effect of connecting resistor 11 in series between generator 6 and control circuit 4 and hence of decreasing the braking torque created by generator 6, which becomes less than the driving torque created by fuel engine 5.

The rotation speed R of motor 5 and the mechanical power Pm it supplies thus increase all the faster when the value of resistor 11 is high.

When rotational speed R reaches value R3 at which signal SR has a value SR3 equal to the new value SC3 of signal SC, comparator circuit 20 restores to signal SI2 its second state, so that switch 12 closes and again short-circuits resistor 11.

Additionally, the value Pm3 of the mechanical power Pm supplied by engine 5 is now equal to the new value Pc3 of the desired power Pc since the value SR3 of signal SR is now equal to the value SC3 of signal SC.

Since moreover switch 12 is now closed and switch 9 is still open, vehicle 1 is again in a stable situation similar to those described earlier, i.e. a situation wherein powers Pm, Pe, Pf and Pn are all equal to the desired power Pc determined by the position of pedal 17, the only difference between the present situation and the preceding situations being the value of desired power Pc and hence of powers Pm, Pe, Pf and Pn.

This situation remains unchanged as long as the driver of vehicle 1 does not modify the position of pedal 17 and the value of signal SC remains thus equal to SC3.

Figure 4A:
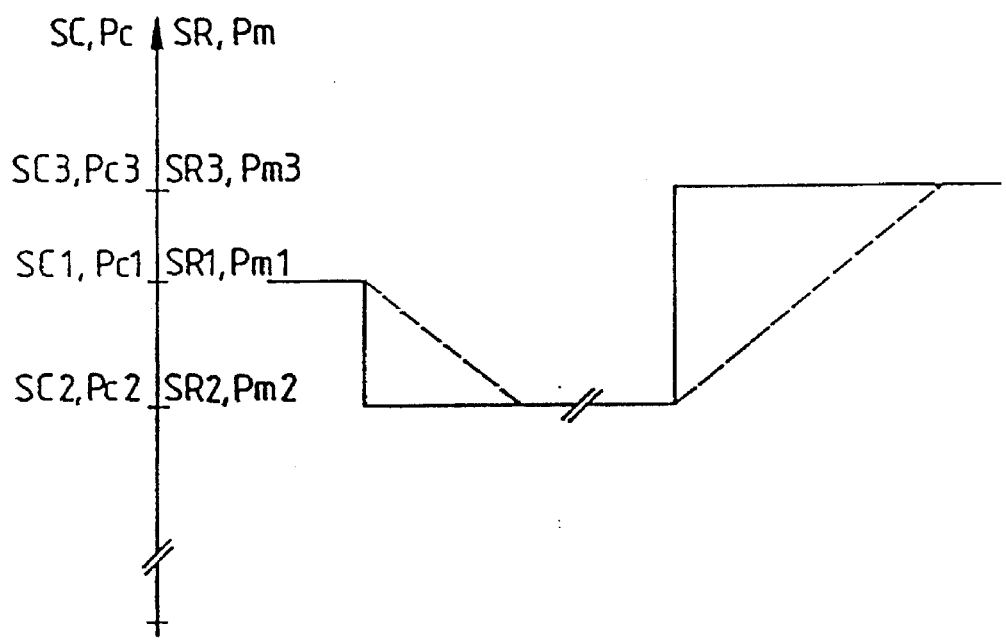
FIGS. 4a, 4b and 4c illustrate the operation of the vehicle of FIG. 1.
Figure 4B:
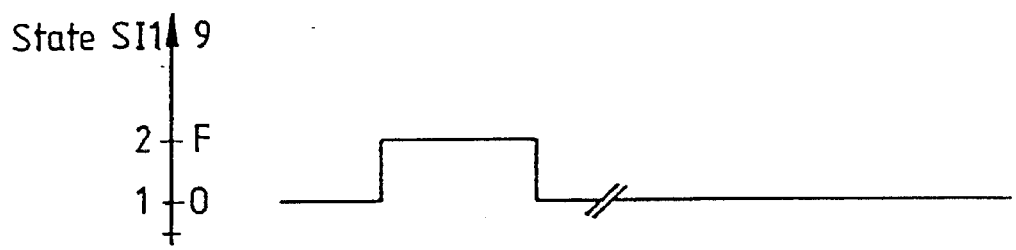
Figure 4C:
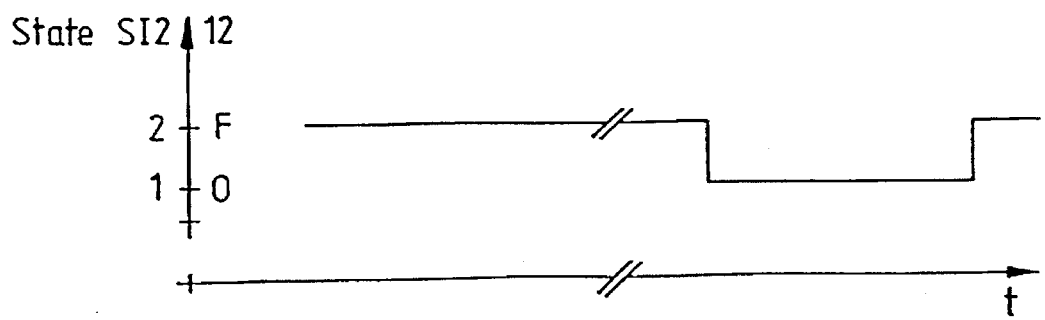

FIGS. 4a, 4b and 4c illustrate diagrammatically the progress of the various processes described above as a function of time t.

In FIG. 4, graph a) illustrates by a continuous line signal SC and the corresponding desired power Pc, and by a broken line the signal SR representative of the rotational speed R of engine 5 and the mechanical power Pm supplied by engine 5. As shown above, signal SR and mechanical power Pm differ respectively from signal SC and desired power Pc only for very short periods of time during which mechanical power Pm varies in response to a variation of signal SC. That is why the broken line representing signal SR and power Pm is only visible during these periods of time. It should be noted that the variations of signal SR and of power Pm are generally not linear as shown for simplification purposes only.

Graphs b) and c) of FIG. 4 respectively represent the states of signal SI1 and switch 9, and the states of signal SI2 and switch 12. In graphs b) and c), references 1 and 2 respectively designate the first and second states of signals SI1 and SI2, and references 0 and F respectively designate the open and closed states of switches 9 and 12.

Clearly a process similar to one of those just described occurs whenever the driver of vehicle 1 modifies the position of accelerator pedal 17.

Figure 5:
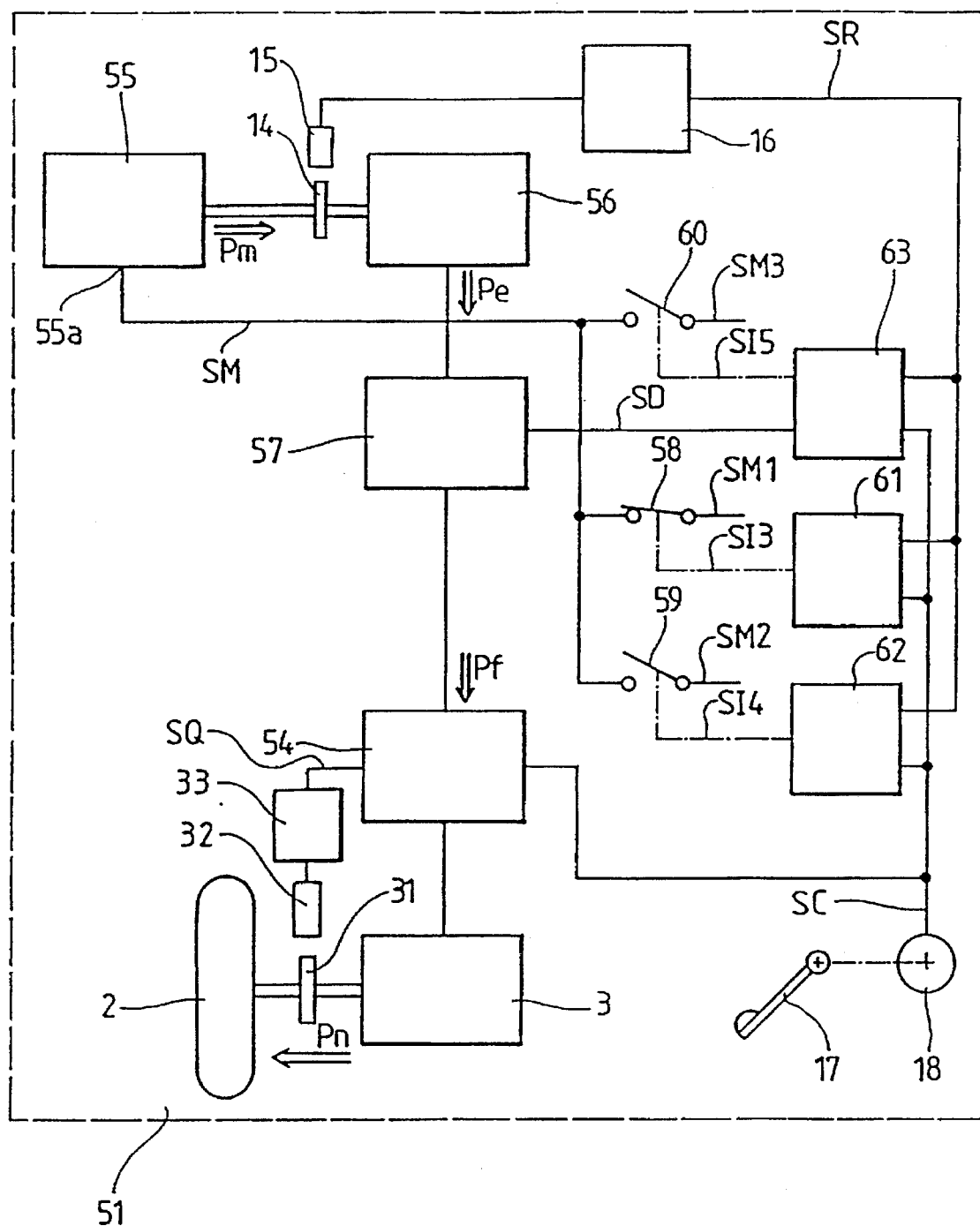
FIG. 5 is a diagrammatic and partial representation, still by way of non-limiting example, of another embodiment of the vehicle according to the present invention.
Figure 8A:
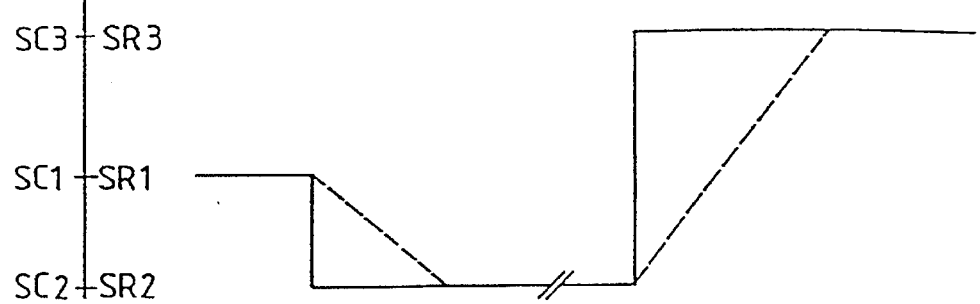
FIGS. 8a, 8b, 8c, 8d, 8e and 8f illustrate the operation of the vehicle of FIG. 5.
Figure 8B:
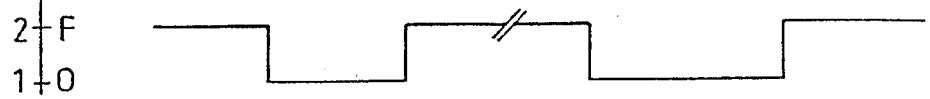
Figure 8C:
Figure 8D:
Figure 8E:
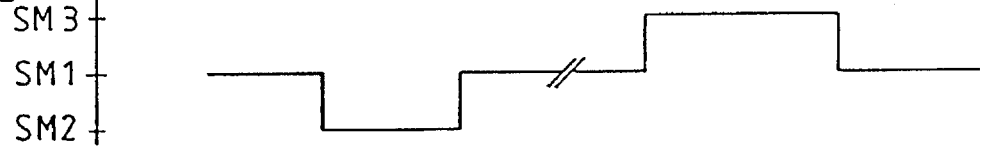
Figure 8F:
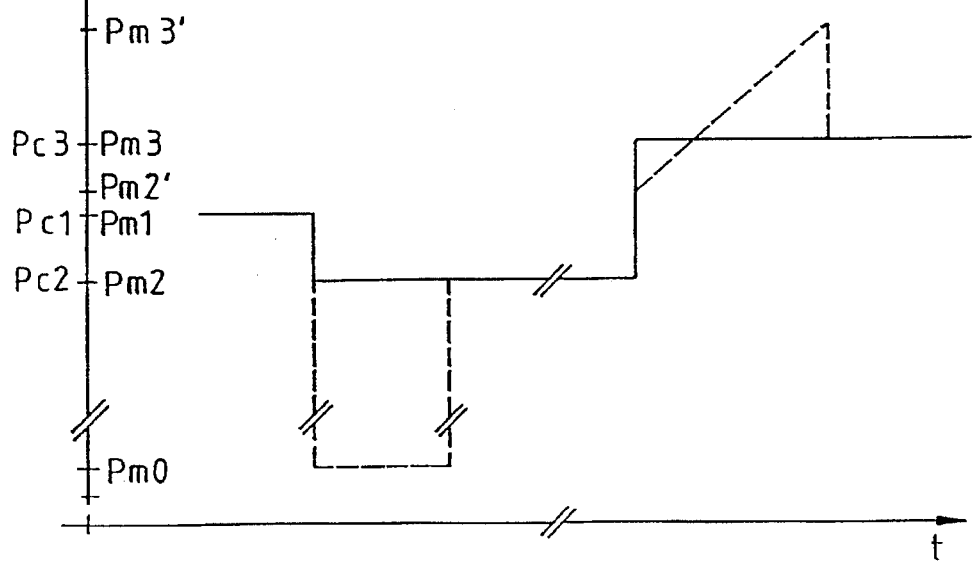

FIG. 5 illustrates diagrammatically and partially another embodiment of the vehicle according to the invention, generally referenced 51.

Like vehicle 1 of FIG. 1, vehicle 51 comprises a driving wheel 2, an electric motor 3 for driving wheel 2, an accelerator pedal 17 and a sensor 18 producing a signal SC representative of the position of pedal 17 and hence of the desired power Pc that motor 3 has to transmit to wheel 2. These elements and this signal are identical to the elements and to the signal that are designated by the same references in FIG. 1 and will therefore not again be described here.

Vehicle 51 further comprises a circuit 54 for controlling motor 3 whose function is similar to that of circuit 4 in FIG. 1 and which will therefore not again be described either. It should however be mentioned that, in this example, the electrical energy which is received by circuit 54, in a manner described later, is supplied thereto under d.c. voltage, and that circuit 54 is of course consequently arranged.

It should be noted here that the electrical connections between the various elements mentioned above or which will be mentioned later have been symbolized by a simple line in FIG. 5, even though these connections consist of several conductors as is obviously the case, for instance, with the connection between control circuit 54 and motor 3.

Vehicle 51 further comprises a fuel engine 55 which, like engine 5 of vehicle 1, may be of the same kind as any of the well-known engines resorting to fuel combustion to produce mechanical energy. However, the device for supplying fuel to engine 55, which has not been shown separately, is arranged, unlike the one of engine 5, to regulate the amount of fuel it supplies to engine 55, and hence the mechanical power Pm produced by the latter at each of its rotational speeds, in dependence on the value of a signal Sm applied to a terminal 55a and which will be described later.

Vehicle 51 furthermore comprises a generator 56 which produces a.c. electrical energy when its rotor, which has not been shown separately, is rotatably driven by the output shaft of engine 55 to which it is mechanically connected.

The output terminals of generator 56, which have not been shown separately either and whose number depends on the single phase or polyphase nature of the a.c. voltage produced by generator 56 are connected to the inputs of a converter 57 for supplying the d.c. voltage needed for the operation of the circuit 54 for controlling the above-mentioned motor 3.

Converter 57 will not be described in detail as it is a circuit well-known to specialists. Suffice it to say here that it is arranged to transmit to control circuit 54 all of the electrical power it receives from generator 56 when a control signal SD, described later, is in a first state, and to transmit to control circuit 54 only part of this electrical power when signal SD is in a second state.

The signal SM mentioned earlier, whose value determines the mechanical power supplied by engine 55 at each of its rotational speeds, is produced by a circuit constituted, in the present example, of three switches 58, 59 and 60 and of three comparators 61, 62 and 63.

A first terminal of each of the switches 58 to 60 is connected to the terminal 55a of engine 55 which, as explained earlier, is intended to receive signal SM.

A source, not shown, supplies to the second terminal of switch 58 a signal of fixed value SM1, to the second terminal of switch 59 another signal of fixed value SM2, and to the second terminal of switch 60 a third signal of fixed value SM3.

For a reason which will become clear later on, the value SM1 is that which signal SM must have for engine 55 to supply, whatever its speed of rotation, a mechanical power equal to a set fraction of its maximum mechanical power, this fraction amounting to 80% in the present example but of course possibly amounting to another value.

Similarly, the value SM2 is that which signal SM must have for engine 55 to supply only a mechanical power less than that it supplies when signal SM has the above-mentioned value SM1. In the present example the value SM2 is that which signal SM must have for engine 55 to supply practically no more mechanical power, while still carrying on rotating.

Further, the value SM3 is that which signal SM must have for engine 55 to supply a mechanical power greater than that it supplies when signal SM has the above-mentioned value SM1. In the present example the value SM3 is that which signal SM must have for engine 55 to supply its maximum mechanical power whatever its speed of rotation.

Figure 6:
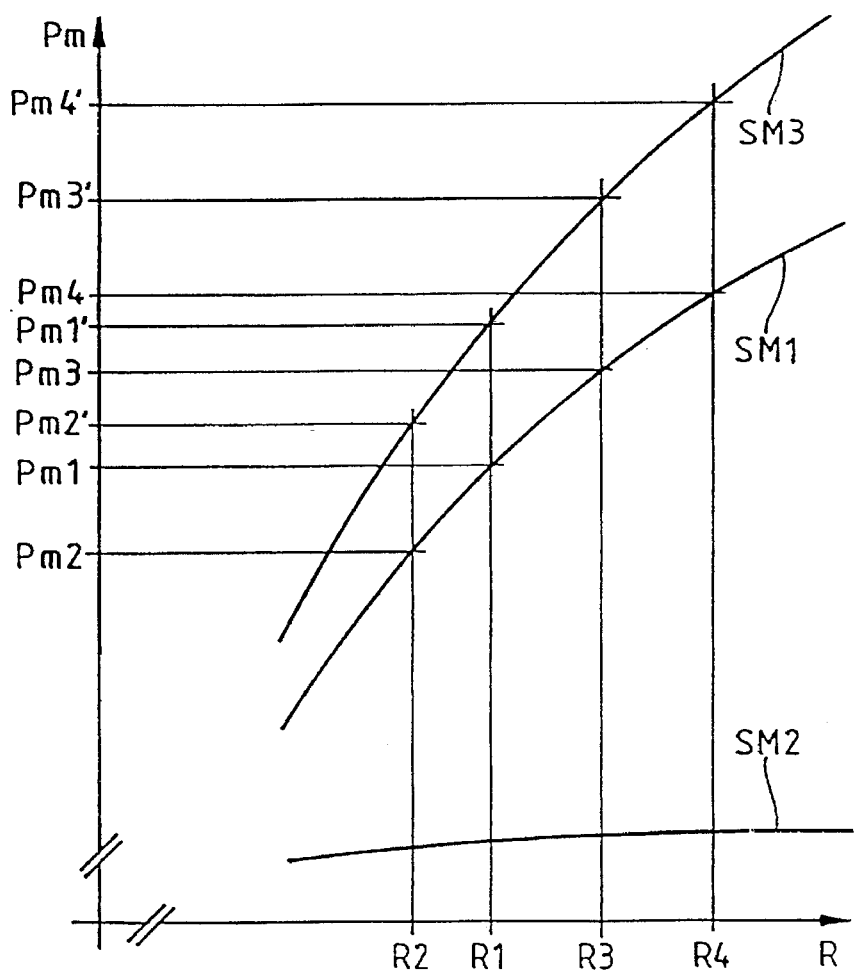
FIG. 6 is a graph diagrammatically representing the mechanical power supplied by a fuel engine in dependence on its rotational speed for a number of values of a control signal.

FIG. 6 diagrammatically illustrates this variation of the mechanical power Pm supplied by engine 55 in dependence on its rotational speed R for the three values SM1, SM2 and SM3 of signal SM.

Switches 58 to 60 have been represented in FIG. 5 as simple contacts, but obviously they preferably consist of electronic elements such as transistors or thyristors.

In whatever manner they are made, switches 58, 59 and 60 are respectively controlled by signals SI3, SI4 and SI5 able each to have two separate states, and they are arranged to be opened or closed depending on whether their respective control signal is in its first or second state.

Thus, in the situation shown in FIG. 6, signal SI3 is in its second state and switch 58 is hence closed, whereas signals SI4 and SI5 are in their first state and switches 59 and 60 are hence open.

The signals SI3 to SI5, which are applied to switches 58 and 60 by connections symbolized by chain-dotted lines, are respectively produced by three comparator circuits 61, 62 and 63 each having a first input connected to circuit 16 and hence receiving signal SR, and a second input connected to sensor 18 and hence receiving signal SC.

The above-mentioned signal SD, for controlling converter 57, is also produced by comparator 63.

Comparator 61 is so arranged that signal SI3 is in its first state when the values of signals SR and SC differ from one another and in its second state when the values of signals SR and SC are equal to one another.

Comparator 62 is so arranged that signal SI4 is in its first state when the value of signal SR is less than or equal to that of signal SC and in its second state when the value of signal SR is greater than that of signal SC.

Comparator 63 is so arranged that the signals SIS and SD are in their first state when the value of signal SR is greater than or equal to that of signal SC and in their second state when the value of signal SR is less than that of signal SC.

The operation of comparators 61 to 63 is summarized in the table of FIG. 7 which indicates the states of signals SI3 to SIS and SD, the states of switches 58 to 60 and the value of signal SM in the three possible cases, i.e. in the cases where signal SR is respectively less than, equal to and greater than signal SC.

In this table, numerals 1 and 2 indicate that the signal whose reference appears at the top of the column is in its first or second state as the case may be.

Comparator 61 to 63 will not be described in greater detail since such circuits are well-known to specialists. Further, their construction obviously depends on the nature of the signals SR and SC they receive at their inputs, on the nature of the signals SI3 to SI5 they must supply to switches 58 to 60 to open or close the latter and, as regards comparator 63, on the nature of the signal SD it must supply to converter 57 to control the latter in the manner described above.

The arrangement consisting of switches 58 to 60 and of comparators 61 to 63 may be regarded as forming a selector that selectively gives to signal SM one of the values SM1 to SM3 depending on the relative values of signals SR and SC.

In the following description of the operation of vehicle 51, the following references will again be used: Pm for the mechanical power supplied by fuel engine 55, Pe for the electric power supplied by generator 56, Pf for the electric power supplied to control circuit 54 (in this case by converter 57), and Pn for the mechanical power supplied by the electric motor 3 to wheel 2. These various powers are also symbolized by arrows in FIG. Further, the losses in the various elements concerned will be neglected, the values of powers Pm and Pe will be assumed to be equal and the values of powers Pf and Pn will also be assumed to be equal.

The vehicle 51 further comprises a device producing a signal representative of the rotational speed R of engine 55, which will also be termed signal SR. The device producing signal SR consists of elements similar to elements 14 to 16 in vehicle 1, which bear the same references as the latter elements and which will therefore not again be described. It should however be stated that, in vehicle 51, elements 14 to 16, and in particular electronic circuit 16, are so arranged that signal SR always has a value equal to that of signal SC when engine 55 supplies a mechanical power Pm equal, firstly, to the desired power Pc corresponding to this value of signal SC and, secondly, to a predetermined fraction of the maximum power it can supply at the speed at which it rotates.

In the following description of vehicle 51, it will be assumed, by way of non-limiting example, that the above-mentioned predetermined fraction is equal to 80%, meaning that when signal SM has its above-mentioned value SM1, which just happens to be that at which engine 55 supplies, regardless of its rotational speed R, a mechanical power equal to 80% of its maximum power, and that signal SR has a value equal to that of signal SC, engine 55 supplies a mechanical power Pm equal to the desired power Pc corresponding to this value of signal SC.

As in the earlier description of the operation of vehicle 1, it will be assumed that, at the start of this description of the operation of vehicle 51, the driver of the latter has maintained accelerator pedal 17 for a certain length of time in a stable position somewhere between its two extreme positions. Signal SC thus has a stable value corresponding to the stable value of the desired power Pc. These two values will also be termed, respectively, SC1 and PC1.

Under these conditions, and as will be made clear further on, fuel engine 55 rotates at the speed, also termed R1, at which signal SR has a value SR1 equal to the value SC1 of signal SC.

The signal SI3 supplied by comparator 61 is thus in its second state and switch 58 is closed, so that signal SM has value SM1. The mechanical power Pm supplied by engine 55 thus has a value PM1 equal to 80% of the maximum power Pm1' that motor 55 can supply at speed R1, and this value PM1 is equal to the value PC1 of the desired power Pc corresponding to the value SC1 of signal SC.

Moreover, signal SD is in its first state, so that the value Pf1 of the electrical power Pf supplied by converter 57 to the circuit 54 for controlling motor 3 is equal to the value Pe1 of the electrical power Pe that is received by converter 57 from generator 56, which power is itself equal to the value PM1 of the mechanical power Pm supplied by engine 55.

The value Pn1 of the mechanical power Pn supplied by motor 3 to wheel 2 being equal to the value Pf1 of the electrical power Pf supplied by converter 57 to control circuit 54, this value Pn1 is also equal to the value PC1 of the desired power Pc.

This situation remains stable as long as the driver of vehicle 51 does not modify the position of the accelerator pedal 17.

When the driver of vehicle 51 decreases, for example, the pressure he is exerting on pedal 17, signal SC takes on a new value SC2 less than the value SC1 it had previously and corresponding to a new value Pc2 of the desired power Pc, also less than the previous value PC1 of the desired power Pc.

As with vehicle 1, this diminution of signal SC has no immediate effect on the rotational speed R of fuel engine 55, and hence on the value of signal SR which remains at SR1.

Signal SC is thus now less than signal SR, so that comparator 61 puts signal SI3 in its first state, thereby opening switch 58, and comparator 62 puts signal SI4 in its second state, thereby closing switch 59.

Signal SM thus takes on value SM2 at which the mechanical power Pm supplied by engine 55 becomes practically nil.

The rotational speed R of engine 55 thus drops rapidly, until signal SR reaches a value SR2 equal to the new value SC2 of signal SC.

Comparator 62 then restores to signal SI4 its first value and comparator 61 restores to signal SI3 its second value, whereby the value of signal SM again becomes equal to SM1.

The value Pm2 of the mechanical power Pm that engine 55 then supplies is again equal to 80% of its maximum mechanical power, and this value Pm2 is moreover equal to the new value Pc2 of the desired power Pc.

The vehicle 51 is thus again in a stable situation similar to that described earlier, i.e. a situation in which powers Pm, Pe, Pf and Pn are all equal to the desired power Pc determined by the position of pedal 17, the only difference between these two situations being the value of the desired power Pc and hence that of powers Pm, Pe, Pf and Pn.

This situation obviously does not change as long as the driver of vehicle 51 does not modify the position of pedal 17 and the value of signal SC hence remains equal to SC2.

If the conductor of vehicle 51 then increases, still by way of example, the pressure he is exerting on pedal 17, signal SC takes on a new value greater than the preceding value SC2 and corresponding to a new value Pc3 of the desired power Pc, which is also greater than value Pc2.

This increase of signal SC has no immediate effect either on the rotational speed R of fuel engine 55, and the value of signal SR thus remains equal to SR2.

Signal SC is thus now greater than signal SR, with the result that comparator 61 gives back to signal SI3 its first value, thereby opening switch 59, and that comparator 63 gives to signal SI5 its second value, thereby closing switch 60. Signal SM thus takes on value SM3, and the mechanical power supplied by engine 55 takes on value Pm2' which is its maximum value at speed R2 at which engine 55 is running at that time.

Simultaneously, comparator 63 gives to signal SD its second value, hence causing the electrical power being absorbed by converter 57 to decrease.

The braking torque set up by generator 56 thus decreases also. Since moreover engine 55 now supplies its full power, its rotational speed R increases rapidly, as also the value of signal SR.

When rotational speed R reaches value R3 at which signal SR has a value equal to the new value SC3 of signal SC, comparator 63 restores to signal SI5 its first state, and comparator 61 restores to signal SI3 its second state. As a result, switch 60 reopens whereas switch 58 closes again, with signal SM resuming value SM1.

The mechanical power Pm supplied by engine 55, which had reached value Pm3', then diminishes and takes a value Pm3 equal to 80% of value Pm3', this value Pm3 being also equal to the new value Pc3 of the desired power Pc.

Simultaneously, comparator 63 restores to signal SD its first state, so that converter 57 resumes transmitting to the control circuit 54 of electric motor 3 all of the electrical power Pe it receives from generator 56.

Vehicle 51 is thus again in a stable position in which powers Pm, Pe, Pf and Pn are all equal to the desired power Pc determined by the position of pedal 17, the only difference between this situation and those described above being the value of the desired power Pc and hence that of powers Pm, Pe, Pf and Pn.

This situation remains unchanged as long as the driver of vehicle 51 does not modify the position of pedal 17 and as long as the value of signal SC thus remains at SC3.

FIG. 8a, 8b, 8c, 8d, 8e and 8f diagrammatically illustrate the progress of the various processes that have just been described as a function of time t.

In FIG. 8 graph a) represents by a continuous line the signal SC and by a broken line the signal SR representative of the rotational speed R of engine 55. As with vehicle 1 described earlier, signal SR only differs from signal SC during those periods of time when the rotational speed R of engine 55 varies in response to a variation of signal SC. That is why the broken line representing signal SR is only visible during those periods of time.

Graphs b), c) and d) respectively represent the states of signal SI3 and of switch 58, of signal SI4 and of switch 59, and of signal SI5 and of switch 60. In graphs b), c) and d) references 1 and 2 respectively designate the first and second states of signals SI3 to SI5, and references O and F respectively designate the open and closed states of switches 58 to 60.

Graph e) of FIG. 8 represents signal SM, and graph f) represents by a continuous line the desired power Pc corresponding to signal SC and by a broken line the mechanical power Pm supplied by engine 55.

As also explained earlier, the mechanical power Pm differs from the desired power Pc only during those periods of time when the mechanical power Pm varies in response to a variation of signal SC. That is why the broken line representing the mechanical power Pm is only visible during those periods of time. In graph f), reference Pm0 designates the value of the mechanical power Pm supplied by engine 55 when signal SM has value SM2.

Obviously a process similar to one of those just described takes place whenever the driver of vehicle 51 modifies the position of accelerator pedal 17.

It should be noted that, in vehicle 1, the rotation speed R of fuel engine 5 is regulated by solely modifying the electrical power supplied by generator 6 whereas, in vehicle 51, the rotational speed R of fuel engine 55 is regulated not only by modifying the electrical power supplied by generator 56 but also by acting on the device for supplying fuel to engine 55. As a result, after each modification of the position of pedal 17 and all other things being equal, the engine 55 of vehicle 51 reaches its new rotational speed more quickly than the engine 5 of vehicle 1.

Figure 9:
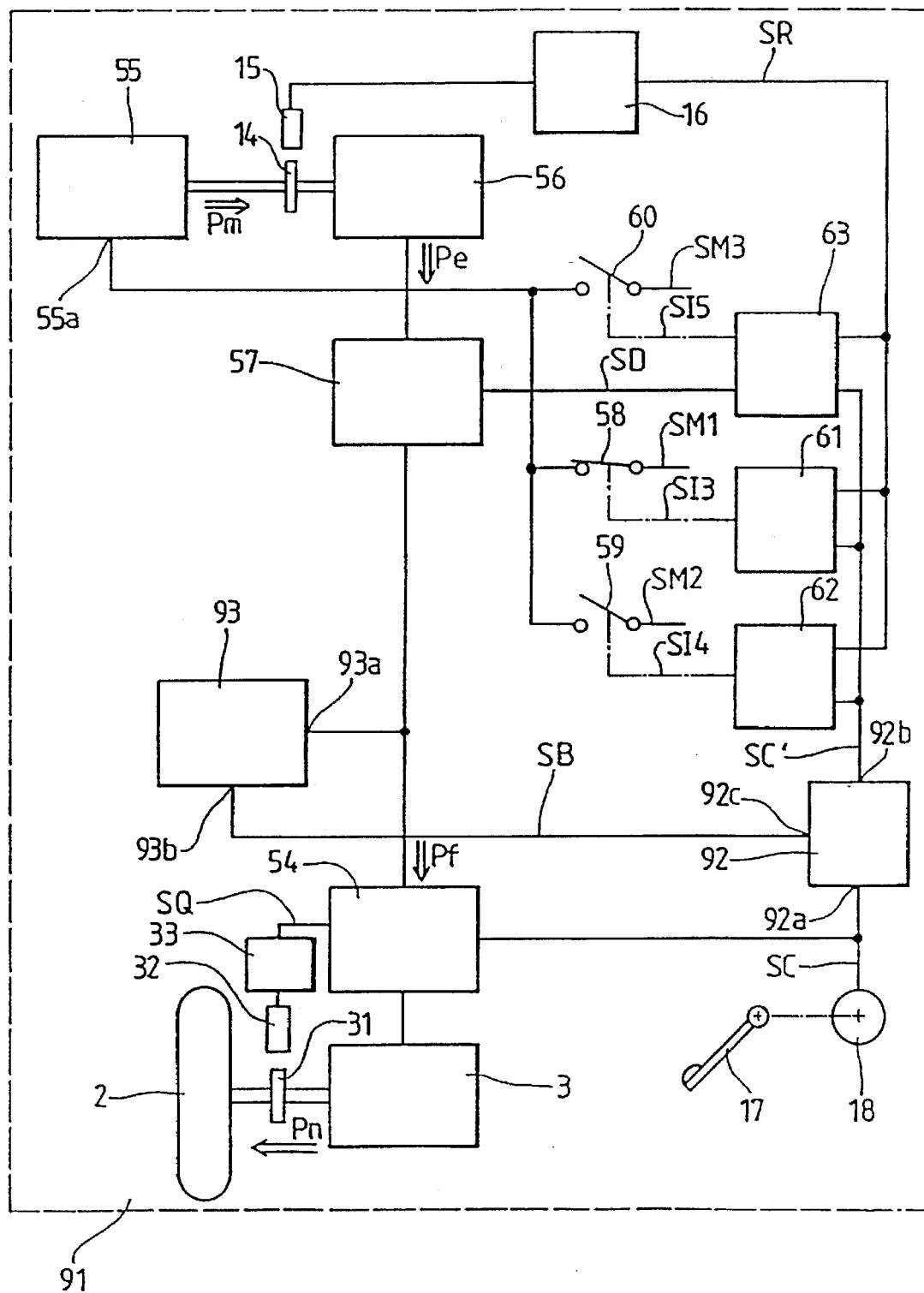
FIG. 9 is a diagrammatic and partial representation, still by way of non-limiting example, of a further embodiment of the vehicle according to the present invention.
Figure 10A:
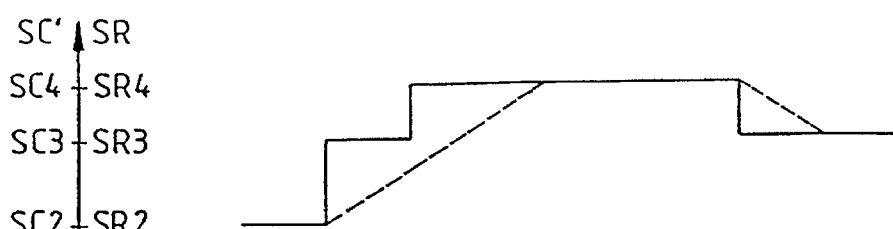
FIGS. 10a, 10b, 10c, 10d, 10e, 10f, 10g, and 10h illustrate the operation of the vehicle of FIG. 9.
Figure 10B:
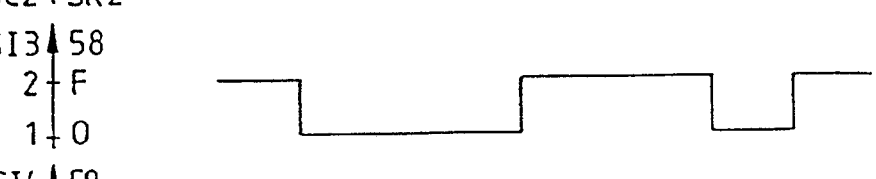
Figure 10C:
Figure 10D:
Figure 10E:
Figure 10G:
Figure 10H:
Figure 10F:
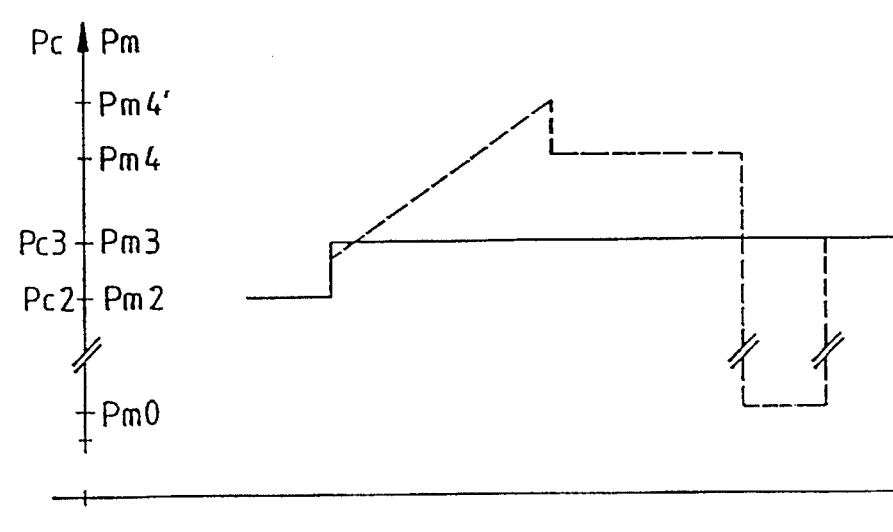

FIG. 9 illustrates diagrammatically and partially another embodiment of the vehicle according to the present invention, referenced 91.

The elements of vehicle 91 that are designated by the same references as the elements of vehicle 51 of FIG. 5 are identical to the latter and will not be described again.

These elements of vehicle 91 are connected to one another like the corresponding elements of vehicle 51, except for sensor 18 which is no longer connected directly to the second inputs of comparators 61 to 63, but which is connected to the input 92a of a controllable adding circuit 92 whose operation will be described further on, these second inputs of comparators 61 to 63 being connected to the output 92b of adder 92.

The output 92b of adder 92 produces a signal SC' which will also be described further on.

Vehicle 91 comprises moreover a source of electrical energy 93 of which an example will be described further on.

Suffice it to say here that source 93 is capable of storing a certain amount of electrical energy and to release the latter as a d.c. voltage substantially equal to the d.c. voltage produced by converter 57. Further, the pair of terminals of source 93 across which this d.c. voltage appears and which have not been shown separately, are respectively connected to the corresponding terminals of converter 57 and of control circuit 54. It should still be added that source 93 has means, not shown separately, that produce, at an output 93b, a detection signal SB representative of the amount of electrical energy Q contained in source 93. These means are so arranged that, when this quantity of electrical energy Q diminishes and becomes equal to or less than a first predetermined quantity Q1, signal SB passes from a first state to a second state, and when this quantity of electrical energy Q increases and becomes equal to or greater than a second predetermined quantity Q2 greater than quantity Q1, signal SB passes from its second state to its first state.

Signal SB is applied to a control input 92a of adder 92 and the latter is so arranged that the above-mentioned signal SC' will be equal to signal SC when signal SB is in its first state, and greater by a predetermined amount than signal SC when signal SB is in its second state.

Adder 92 will not be described in detail as its construction will not give rise to any particular problem to a man of the art.

As long as the amount of energy Q contained in source 93 is greater than the above-mentioned predetermined quantity Q1, the operation of vehicle 91 is identical to that of vehicle 51 described earlier since signal SB is then in its first state and signal SC' is therefore equal to signal SC. This operation will therefore not be described again in detail.

It will simply be recalled that when the value of signal SC, in the case of vehicle 51, or of signal SC', in the case of vehicle 91, is greater than the value of signal SR, comparator 63 puts, in particular, signal SD in its second state, with the result that converter 57 transmits to control circuit 54 only a portion of the electrical power Pe it receives from generator 56. The value of this portion will hereinafter be termed Pe'.

In the case of vehicle 51, when signal SC passes from a value SC2 to a higher value SC3 as in the above described example, and as long as signal SD is in its second state, the mechanical power Pn supplied by motor 3 to wheel 2, which is equal to the electrical power received by control circuit 54, thus has value Pe', which is of course less than value Pc3 of the desired power Pc corresponding to the new value SC3 of signal SC.

But in the case of vehicle 91 and in the same circumstances as above, the electrical energy source 93 supplies to control circuit 54 an electrical power whose value, which shall be termed Pe", is equal to the difference between the value Pc3 of the desired power Pc and the value Pe' of the electrical power that converter 57 still transmits to control circuit 54. The value of the mechanical power Pn supplied by motor 3 to wheel 2 thus becomes immediately equal to the new value Pc3 of the desired power Pc as soon as the value of the power setting signal SC passes from SC2 to SC3.

Following this supply of electrical power Pe" to control circuit 54, the quantity of electrical energy Q contained in source 93 diminishes.

If this quantity of electrical energy Q, when the value of signal SC passes from SC2 to SC3, is greater than the above-mentioned predetermined quantity Q1, signal SB has its first value and signal SC', which is equal to signal SC, therefore has the same value SC3 as the latter.

If moreover, this quantity of electrical energy Q does not become equal to or less than the predetermined quantity Q1 before the rotational speed R of engine 55 reaches value R3, signal SC' retains this value SC3 and a process identical to that described in the case of vehicle 51 takes place when rotational speed reaches value R3. This process will not be described again.

If, however, the quantity of electrical energy Q does become equal to or less than the predetermined quantity Q1 before the rotational speed R reaches value R3, signal SB takes on its second state, and signal SC' takes on a new value SC4 greater than the value SC3 of signal SC.

In such a case, it is only of course when the rotational speed R of engine 55 reaches value R4 at which signal SR has a value SR4 equal to the value SC4 of signal SC' that signals SI5 and SD resume their first state and that signal SI3 resumes its second state, with the same consequences as those described above.

From then on, engine 55 supplies a mechanical power Pm having a value Pm4 equal to 80% of the maximum mechanical power Pm4' that it can supply at speed R4.

The value Pm4 of the mechanical power Pm is obviously greater than the value Pc3 of the desired power Pc corresponding to the value SC3 of signal SC, and the same of course applies to the value Pe4 of the electrical power Pe supplied by generator 56, which is equal to value Pm4.

Since signal SD is now in its first state, the electrical power supplied by converter 57 also has a value equal to Pe4. But the value of the electrical power that can be absorbed by control circuit 54 is only equal to the value Pc3 of the desired power Pc corresponding to the value SC3 of signal SC. The difference between the electrical power supplied by converter 57 and that absorbed by control circuit 54 is then absorbed by source 93, and the quantity of electrical energy Q contained in the latter increases.

When the quantity of electrical energy Q reaches the predetermined amount Q2, signal SB resumes its first state, and the value of signal SC' becomes equal to that of signal SC, i.e. to SC3.

The value SC3 of signal SC' being less than the value SR4 of signal SR, comparator 61 puts signal SI3 back in its first state and comparator 62 puts signal SI4 in its second state, with the result that the rotational speed R of engine 55 diminishes rapidly as described above.

When rotational speed R reaches value R3 and the value of signal SR thus becomes equal to the value SC3 of signal SC', comparator 62 puts signal SI4 back in its first state and comparator 61 puts signal SI3 back in its second state.

From then on, engine 55 again supplies a mechanical power Pm having a value Pm3 that is equal, firstly, to the value Pc3 of the desired power Pc corresponding to the value SC3 of signal SC and, secondly, to 80% of the maximum power Pm3' that engine 55 can supply at this rotational speed R3, and this situation remains unchanged as long as the driver of vehicle 91 does not modify the position of accelerator pedal 17.

FIG. 10a, 10b, 10c, 10d, 10e, 10f, 10g and 10h diagrammatically illustrate the progress of the process just described as a function of time t.

In FIG. 10, graph a) represents signal SC' with a continuous line and signal SR with a broken line, and graphs b) to f) represent the same signals or the same magnitudes as the graphs bearing the same reference in FIG. 8. Further, in FIG. 10, graphs g) and h) respectively represent the quantity of electrical energy Q contained in source 93 and signal SB, the first and second states of the latter being respectively identified by references 1 and 2.

The above-mentioned values R4 and Pm4' have also been indicated in FIG. 6.

From the above-description of the operation of vehicle 91 it is apparent that source 93 supplies electrical energy to control circuit 54 only when signal SD is in its second state, i.e. during the time when the rotational speed R of engine 55 increases following an increase in the value of signal SC.

But this increase in the rotational speed R is very rapid and only lasts a few seconds. Further, during this increase in the rotational speed R, source 93 must only supply a part of the electrical power absorbed by control circuit 54. The quantity of electrical energy that source 93 must be able to contain may therefore be considerably less than that which the battery provided in the above-described known vehicles is required to contain.

The source of rechargeable electrical energy 93 may thus consist of a simple capacitor, e.g. an electrolytic capacitor, or, if necessary, a set of several capacitors.

Source 93 may also consist of a simple battery of conventional, e.g. lead or cadmium-nickel, accumulators.

In some cases however the d.c. voltage needed to operate control circuit 54 is relatively high, of the order of some hundred volts. A battery of conventional accumulators supplying such a voltage is bulky and expensive. In such cases, source 93 thus preferably consists of a combination of a battery of conventional accumulators supplying a relatively low voltage, e.g. 12 volts, of a voltage amplifier supplying the necessary high voltage from this low voltage, and of a circuit able to recharge the battery, when needed, from the high voltage produced by converter 57. Such a source of energy has not been shown and will not be described in greater detail as its construction does not give rise to any particular problem to a man of the art.

The battery of accumulators comprised by source 93 in the examples just described having a considerably lesser capacity than that of the battery provided in known vehicles, all of the above-mentioned drawbacks, which are due to the presence of a battery of accumulators in a vehicle, are thus also considerably reduced.

Figure 11:
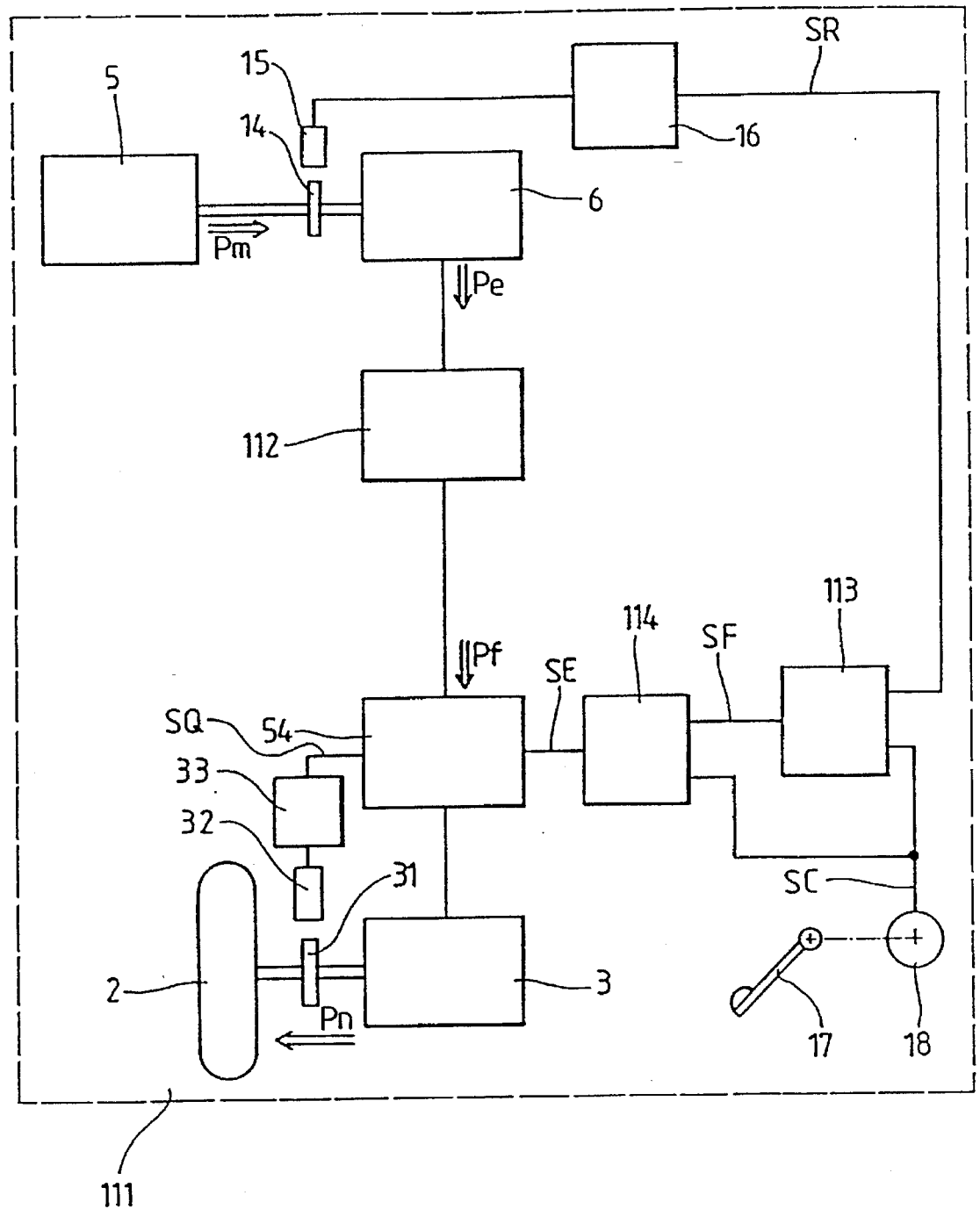
FIG. 11 is a diagrammatic and partial representation, still by way of non-limiting example, of another embodiment of the vehicle according to the present invention.

FIG. 11 diagrammatically and partially represents another embodiment of the vehicle according to the invention, which is referenced 111.

Elements 2, 3, 5, 6, 14 to 18 and 31 to 33 of vehicle 111 are identical to elements designated by the same references in FIG. 1 and will therefore not be described again.

It will be merely recalled that the device which supplies engine 5 with fuel is so arranged that the latter always produces the maximum mechanical power it can produce at the speed at which it rotates whatever the latter rotation speed.

Vehicle 111 further comprises a control circuit of the electrical motor 3 which is referenced 54 for it is identical to the control circuit designated by the same reference in the diagram of FIG. 5. This control circuit will not be described again here, except for mentioning that its control signal, the value of which determines the electrical power it supplies to motor 3, is referenced SE in this example.

The d.c. voltage needed by control circuit 54 to function is provided by a converter 112 the inputs of which are connected to generator 6.

Converter 112 will not be described in detail for it can be realized in different well-known ways. It will be merely mentioned that it is so arranged that it permanently transmit to control circuit 54 the whole electric power absorbed by the latter, contrarily to converter 57 of vehicle 51 represented in FIG. 5, and thus does not comprise any input intended for receiving a signal like the control signal SD of that converter 57. Vehicle 111 further comprises a calculating circuit 113 the inputs of which respectively receive signal SR representative of the rotation speed R of engine 5 and signal SC representative of the position of accelerator pedal 17 and thus of desired power Pc.

Calculating circuit 113 is so arranged that the signal SF it provides is equal to the product of the difference between signals SR and SC by a factor greater than one.

So, signal SF is respectively nil, positive or negative depending on signal SR being equal to, higher than or lower than signal SC, and the absolute value of that signal SF is always higher than the one of the difference between signals SR and SC when the latters are not equal to each other.

Signal SF is applied to the first input of an adding circuit 114 the second input of which receives signal SC and the output of which provides the above-mentioned signal SE. Signal SE is thus equal to, higher than or lower than signal SC depending on signal SF being nil, positive or negative. Further, when signals SR and SC are not equal to each other, the absolute value of the difference between signals SE and SC is higher than that of the difference between signals SR and SC.

The operation of vehicle 111 will not be described in all its details for it is easily deductible from the above explanations.

It can be seen that when signal SR is equal to signal SC, signal SF is nil and signal SE is equal to signal SC. Vehicle 111 is thus in a stable situation where powers Pm, Pe, Pf and Pn are equal to each other, except for the power losses, as well as to the desired power Pc corresponding to the value of signal SC determined by the position of accelerator pedal 17.

If now the driver of vehicle 111 decreases the pressure he is exerting on pedal 17, signal SC assumes a new value less than the preceding one and thus than the value of signal SR.

Signal SF produced by the calculating circuit 113 thus becomes positive, and signal SE increases despite the decrease of signal SC. The electric power Pf absorbed by the control circuit 54 of motor 3 thus increases, as well as of course the electric power Pe provided by generator 6.

It follows that the braking torque exerted by generator 6 upon engine 5 increases, so that the rotation speed R of the latter decreases.

When that rotation speed R reaches the value at which signal SR is again equal to signal SC, signal SF becomes again nil and signal SE becomes again equal to signal SC. Vehicle 111 is thus again in a stable situation where powers Pm, Pe, Pf and Pn are equal to the desired power Pc corresponding to the new value of signal SC.

If now the driver of vehicle 111 increases the pressure he is exerting on pedal 17, signal SC assumes a new value which is greater than the preceding one and thus than the value of signal SR.

Signal SF becomes thus negative, and signal SE decreases despite the increase of signal SC. The electrical power absorbed by the control circuit 54 thus decreases, as well as the electrical power Pe provided by generator 6.

It follows that the braking torque exerted by generator 6 upon engine 5 decreases, so that the rotation speed R of the latter increases.

When that rotation speed R reaches the value at which signal SR is again equal to signal SC, signal SF becomes nil again and signal SE becomes again equal to signal SC. Vehicle 111 is thus again in a stable situation where powers Pm, Pe, Pf and Pn are equal to the desired power corresponding to the new value of signal SC.

It can be seen that in vehicle 111, as in above-described vehicle 1 of FIG. 1, the rotation speed R of the fuel engine 5 is solely regulated in temporarily modifying the electric power the generator 6 has to provide, that power being respectively decreased or increased depending on that rotation speed R having to increase or to decrease. Further, engine 5 permanently supplies the maximum mechanical power it can supply at the speed at which it turns and thus permanently functions in conditions where its efficiency is maximum.

In above described vehicles 51 and 91 of FIGS. 5 and 9, the rotation speed of fuel engine 5 is not only regulated in temporarily modifying the electric power Pe the generator 6 has to supply, but also in modifying the amount of fuel and/or of combustive agent that is supplied to that engine 5 by its feeding device. Nevertheless, that engine 5 operates most of the time in conditions where it supplies a mechanical power that is relatively near of its maximum power and that is a fixed and predetermined fraction of the latter. The characteristics of that engine 5 may thus be chosen in such a way that its efficiency is maximum when it operates in these conditions.

In short, it will be seen that in the vehicle according to the present invention of which some embodiments have just been described, the fuel engine operates permanently, and that its rotational speed is regulated to the value at which the mechanical power it supplies equals, on the one hand, the desired power Pc set by the position of the vehicle's accelerator pedal 17 and, on the other hand, a predetermined fraction, which may be equal to 100% in some embodiments, of the maximum mechanical power it can supply at this speed.

It is these characteristics that provide the vehicle according to the invention with the above-mentioned advantages, i.e. that make it possible to avoid having to provide it with a battery of accumulators able to supply all of the electrical energy needed for its operation.

It has been ascertained that, practically, a driver very often modifies the position of the accelerator pedal of his vehicle, even if he does not want to change the speed of the latter.

These modifications, which are most of the time unconscious and of small amplitude, have the effect, in a vehicle according to the present invention, that the value of signal SC produced by the sensor 18 of the position of accelerator pedal 17 also very often varies and remains only rarely constant for an appreciable length of time, except of course when pedal 17 is either completely relaxed or completely depressed.

Now, it has be seen hereabove that, in a vehicle according to the present invention such as represented in FIGS. 1, 5 and 11, the electrical power Pf provided to the control circuit 4 or 54 of driving motor 3 temporarily decreases in response to each increase, even small, of signal SC. It has also be seen that, in a vehicle according to the present invention such as represented in FIGS. 1 and 11, the electrical power Pf also temporarily increases in response to each decrease, even small, of signal SC.

It follows from the preceding that, even when the driver of a vehicle according to the present invention does not want to modify the speed of the latter, the electrical power Pf supplied to control circuit 4 or 54 of driving motor 3 may vary quite often. The same obviously applies to the electrical power supplied by control circuit 4 or 54 to driving motor 3, and thus to the mechanical power Pn provided by the latter to wheel 2.

These variations of that mechanical power Pn have almost the same effect than the one which is produced, in a vehicle provided with an automatic gear-box, by a modification of the transmission ratio of the latter, and are thus generally not perceived as being particularly troublesome by the driver of a vehicle according to the present invention and/or by its passengers.

It would be obviously possible to suppress these variations of the mechanical power Pn caused by the above-mentioned small displacements of pedal 17 in inserting a low-pass filter between sensor 18 and the different circuits that receive signal SC.

But it is well known that the output signal of a low-pass filter only changes with some delay in response to the variations of the input signal of this filter, and that this delay is all the longer when the cut-off frequency of the filter is low.

Now, a low-pass filter inserted between sensor 18 and the circuits which receive signal SC should have a very low cut-off frequency, in the order of 1 Hz or even lower than 1 Hz, to be efficient. The delay of signal SC with respect to the signal produced by sensor 18 would thus be quite long and would be a drawback in any case where the vehicle's driver moves willingly and quickly the accelerator pedal 17.

It is nevertheless possible, if desired, to suppress the variations in the mechanical power Pn caused by the above-mentioned small variations of the position of accelerator pedal 17 without introducing an unacceptable delay in case of a rapid displacement of pedal 17.

Figure 12:
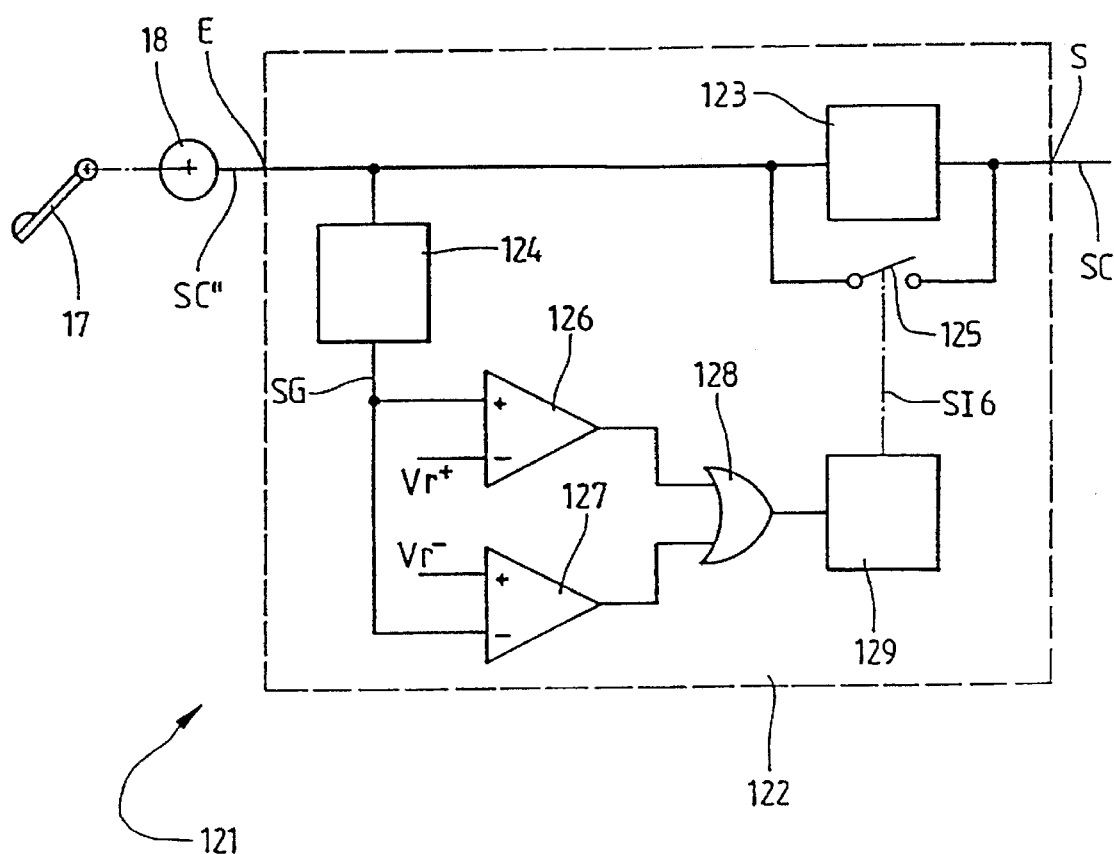
FIG. 12 diagrammatically represents control means that are usable in a vehicle according to the present invention.

For that purpose, it is for instance possible to replace the control means that is merely constituted by accelerator pedal 17 and sensor 18 in the above described embodiments by control means like the one that is represented in FIG. 12 with reference 121.

As the above described one, control means 121 comprises an accelerator pedal and a sensor providing a signal representative of the position of that pedal, that are also referenced 17 and 18 respectively.

In the present example, the signal provided by sensor 18 will be referenced SC".

Further to pedal 17 and sensor 18, control means 121 comprises a filtering and commutating circuit 122 the purpose and functioning of which will be made clear by the following description.

Input E of filtering and commutating circuit 122 is connected, on the one hand, to sensor 18 and, on the other hand, to the inputs of a low-pass filter 123 and of a differentiating circuit 124, as well as to a first terminal of a switch 125.

The output of filter 123 and the second terminal of switch 125 are connected to each other and to output S of circuit 122, which supplies signal SC.

Filter 123, differentiating circuit 124 and switch 125 will not be described in detail for they can be realized in different well-known ways.

It will be merely mentioned that switch 125 is preferably constituted by an electronic element such as a transistor or a thyristor, and that it is arranged for being open or closed depending on a control signal SI6, the production of which will described later on, being in a first or a second state.

It will be also mentioned that the low-pass filter 123 is so arranged that its cut-off frequency is of the order of one Herz and even, preferably, lower than one Herz. Further, filter 123 is so arranged that the value of signal SC is at least substantially equal to the mean value of signal SC" when switch 125 is open.

It will be further mentioned that the value of signal SG produced by the differentiating circuit 124 is always, in a conventional way, proportional to the slope of signal SC". In other words, signal SG is either positive or negative depending on signal SC" increasing or decreasing, i.e. depending on pedal 17 being moved towards its end of run abutment or towards its rest position, and the absolute value of signal SG is proportional to the displacement speed of that pedal 17.

Signal SG is applied to the direct input, designated by sign +, of a first comparator circuit 126, as well as to the inverse input, designated by sign −, of a second comparator circuit 127. The inverse input− of comparator circuit 126 receives a positive reference voltage $Vr^+$ and the direct input + of comparator circuit 127 receives a negative reference voltage $Vr^-$ the absolute value of which equals the value of voltage $Vr^+$.

The reference voltages $Vr^+$ and $Vr^-$ are supplied by a source which has not been represented and which is so arranged that the value of voltage $Vr^+$ is equal to the value of signal SG when the pedal 17 is moved at a determined speed towards its end of run abutment, and that the value of voltage $Vr^-$ is equal to the value of signal SG when the pedal 17 is moved at the same determined speed towards its rest position.

By way of example, that determined speed may be equal to the mean speed of pedal 17 when it is moved from one of its extreme positions to the other in 0,5 second.

Comparator circuits 126 and 127 will not be described either for they also may be realized in different well-known ways. It will be merely mentioned that they are so arranged that their output either presents a substantially nil voltage or a positive voltage depending on their direct input + being respectively negative or positive with respect to their inverse input −. In accordance with a very generally accepted convention, it will be said that the output of comparator circuit 126 or 127 is at logic state "0" or "1" depending on this output presenting respectively a substantially nil or positive voltage.

The outputs of comparator circuits 126 and 127 are each connected to an input of an OR gate 128, the output of which is connected to the input of a control circuit 129 for switch 125, which is 'so arranged that signal SI6 has its first or its second state, i.e. that switch 125 is open or closed, according to its input being respectively at logic state "0" or "1".

The operation of control means 121 will not be described in detail for it easily follows from the above given explanations.

It is in effect easily seen that as long as the driver of a vehicle fitted with control means 121 does not willingly modify the position of pedal 17, signal SG is nil and both the outputs of comparators circuits 126 and 127 are at logic state "0", as well as output of OR gate 128.

Signal SI6 is thus in its first state and switch 125 is open.

Signal SC is thus practically identical with signal SC" but does not present the small variations of the latter which are caused by the small, unintentional displacements of pedal 17 and which are suppressed by filter 123. These small displacements of pedal 17 thus no more cause variations in the mechanical power Pn supplied by driving motor 3 to wheel 2.

The same applies when the vehicle's driver moves pedal 17 at a speed that is smaller than the above-mentioned determined speed. Depending on the direction of this displacement, signal SG becomes positive or negative but remains comprised between voltages $Vr^+$ and $Vr^-$. Outputs of comparator circuits 126 and 127 both remain at logic state "0", and switch 125 remains open. Signal SC thus varies as signal SC", without presenting the small variations the latter may present.

But, when the vehicle's driver moves pedal 17 at a speed which is higher than the above-mentioned determined speed, signal SG becomes either more positive than voltage $Vr^+$ or more negative than voltage $Vr^-$, depending on the direction of displacement of pedal 17. The output of one of the comparator circuits 126 and 127 then takes the logic state "1", so that signal SI6 takes its second state and switch 125 closes, thus short-circuiting filter 123. Signal SC is now identical with signal SC" and immediately varies as does the latter.

It can be seen that the control means 121 actually allows to suppress the variations of the mechanical power Pn supplied by motor 3 to wheel 2 which are due to the unconscious small displacements of pedal 17, without introducing an unacceptable delay in case of a rapid displacement of that pedal 17.

Vehicles 1, 51, 91 and 111 described above with reference to FIGS. 1, 5, 9 and 11 comprise only a single driving wheel driven by a single electric motor. Clearly the present invention also applies to vehicles having several driving wheels driven together by a single motor or driven in groups or individually by several motors.

Further, the accelerator pedal 17 of vehicles 1, 51, 91 and 111 may of course be replaced by any other device operable by the driver of these vehicles, such as, for instance, a hand lever.

Many other modifications may be made to the above-described vehicles within the scope of the present invention.

Thus, for instance, the rotational speed of the fuel engine of a vehicle according to the present invention may be regulated by means other than those described, in particular with the help of a computer programmed to supply the various signals needed for this regulation in dependence on the above-mentioned signals SC and SR.

Moreover, in vehicle 1 of FIG. 1, generator 6 may be replaced by a generator producing a polyphase, e.g. three phased, a.c. voltage, regulation circuit 7 and control circuit 4 being of course suitably adapted. Regulation circuit 7, in particular, comprises in such a case several first regulation elements 10 each connected across two of the terminals of generator 6 and several second regulation elements 13 each connected across one of the terminals of generator 6 and one of the terminals of control circuit 4, the control of regulation elements 10 and 13 being the same as that of elements 10 and 13 of FIG. 1.

What is claimed is:

1. A motor vehicle comprising:

a fuel engine for producing a first mechanical power;

a generator for converting said first mechanical power into a first electrical power;

control means operable by a driver of said vehicle to produce a power setting signal representative of a desired power;

a driving wheel;

motor means for supplying a second mechanical power to said driving wheel from a second electrical power, said motor means including an electric motor mechanically coupled to said driving wheel and a circuit for controlling said electric motor that is responsive to said power setting signal to regulate the value of said second mechanical power to the value of said desired power; and, regulating means responsive to said power setting signal to regulate the rotational speed of said fuel engine to the value at which said first mechanical power is at least substantially equal, firstly, to said desired power and, secondly, to a set fraction of the maximum mechanical power of said fuel engine, said regulating means including transfer means electrically coupled to said generator and to said motor means to produce said second electrical power from said first electrical power, wherein said regulating means includes means for producing a measurement signal representative of said rotational speed and means for supplying a comparison signal between said measurement signal and said power setting signal, wherein said transfer means is arranged to respond to said comparison signal to increase the braking torque exerted by said generator on said fuel engine when said measurement signal is greater than said power setting signal and to decrease said braking torque when said measurement signal is less than said power setting signal, and wherein said transfer means includes a first regulating element connected across a first terminal and a second terminal of said generator and a second regulating element connected across said first terminal of said generator and a terminal of said control circuit, said first regulating element including a first resistor and a first switch connected in series with said first resistor and responsive to said comparison signal to connect said first resistor across said terminals of said generator when said first measurement signal is greater than said power setting control signal and to disconnect said first resistor from said terminals of said generator when said measurement signal is less than or equal to said power setting signal, and said second regulating element including a second resistor and a second switch connected in parallel with said second resistor and responsive to said comparison signal to connect said second resistor in series across said first terminal of said generator and said terminal of said control circuit when said measurement signal is less than said power setting signal and to directly connect said first terminal of said generator to said terminal of said control circuit when said measurement signal is greater than or equal to said power setting signal.

2. A vehicle according to claim 1, wherein said transfer means includes power supply means connected between said generator and said control circuit and responsive to said comparison signal for supplying to said control circuit an electrical power equal to said first electrical power when said measurement signal is greater than or equal to said power setting signal and for supplying to said control circuit an electrical power less than said first electrical power when said measurement signal is less than said power setting signal.

3. A vehicle according to claim 2 further comprising a rechargeable source of electrical energy arranged to supply to said control circuit an electrical power having a value equal to the difference between said desired power and the electrical power supplied by said power supply means.

4. A motor vehicle comprising:
a fuel engine for producing a first mechanical power;
a generator for converting said first mechanical power into a first electrical power;
control means operable by a driver of said vehicle to produce a power setting signal representative of a desired power;
a driving wheel;
motor means for supplying a second mechanical power to said driving wheel from a second electrical power, said motor means including an electric motor mechanically coupled to said driving wheel and a circuit for controlling said electric motor that is responsive to said power setting signal to regulate the value of said second mechanical power to the value of said desired power; and, regulating means responsive to said power setting signal to regulate the rotational speed of said fuel engine to the value at which said first mechanical power is at least substantially equal, firstly, to said desired power and, secondly, to a set fraction of the maximum mechanical power of said fuel engine, said regulating means including transfer means electrically coupled to said generator and to said motor means to produce said second electrical power from said first electrical power, wherein said regulating means includes means for producing a measurement signal representative of said rotational speed and means for supplying a comparison signal between said measurement signal and said power setting signal, wherein said vehicle further comprises a device for supplying fuel to said fuel engine that is responsive to said comparison signal to regulate said first mechanical power to a value greater than that of said set fraction of said maximum mechanical power when said measurement signal is less than said power setting signal, to the value of said set fraction of said maximum mechanical power when said measurement signal is equal to said power setting signal, and to a value less than that of said set fraction of said maximum mechanical power when said measurement signal is greater than said power setting signal, and wherein said transfer means is arranged to respond to said comparison signal to reduce the braking torque exerted by said generator on said fuel engine when said measurement signal is less than said power setting signal.

5. A vehicle according to claim 4, wherein said transfer means includes power supply means connected between said generator and said control circuit and responsive to said comparison signal for supplying to said control circuit an electrical power equal to said first electrical power when said measurement signal is greater than or equal to said power setting signal and for supplying to said control circuit an electrical power less than said first electrical power when said measurement signal is less than said power setting signal.

6. A vehicle according to claim 5 further comprising a rechargeable source of electrical energy arranged to supply to said control circuit an electrical power having a value equal to the difference between said desired power and the electrical power supplied by said power supply means.

7. A motor vehicle comprising:
a fuel engine for producing a first mechanical power;
a generator for converting said first mechanical power into a first electrical power;
control means operable by a driver of said vehicle to produce a power setting signal representative of a desired power;
a driving wheel;
motor means for supplying a second mechanical power to said driving wheel from a second electrical power, said motor means including an electric motor mechanically coupled to said driving wheel and a circuit for controlling said electric motor that is responsive to said power setting signal to regulate the value of said second mechanical power to the value of said desired power; and, regulating means responsive to said power setting signal to regulate the rotational speed of said fuel engine to the value at which said first mechanical power is at least substantially equal, firstly, to said desired power and, secondly, to a set fraction of the maximum mechanical power of said fuel engine, said regulating means including transfer means electrically coupled to said generator and to said motor means to produce said second electrical power from said first electrical power, wherein said regulating means includes means for producing a measurement signal representative of said rotational speed and means for supplying a comparison signal between said first measurement signal and a second power setting signal;

wherein said transfer means includes a converter connected between said generator and said control circuit and responsive to said comparison signal for supplying to said control circuit an electric power equal to said first electrical power when said measurement signal is greater than or equal to said second power setting signal and for supplying to said control circuit an electrical power less than said first electrical power when said measurement signal is less than said second power setting signal;

wherein said vehicle further comprises a rechargeable source of electrical energy arranged to supply to said control circuit an electrical power having a value equal to the difference between said desired power and the electrical power supplied by said converter, and a device for supplying fuel to said fuel engine that is responsive to said comparison signal to regulate said first mechanical power to a value greater than that of said set fraction of said maximum mechanical power when said measurement signal is less than said second power setting signal, to the value of said set fraction of said maximum mechanical power when said measurement signal is equal to said second power setting signal, and to a value less than that of said set fraction of said maximum mechanical power when said measurement signal is greater than said second power setting signal, said source including means for supplying a detection signal representative of the quantity of electrical energy contained in said source; and, wherein said vehicle further comprises means responsive to said detection signal for producing said second power setting signal with a value equal to the sum of the value of said first power setting signal and of a predetermined value when said quantity of electrical energy becomes less than a first predetermined quantity and with a value equal to the value of said first power setting signal when said quantity of electrical energy becomes greater than a second predetermined quantity.

8. A motor vehicle comprising:

a fuel engine for producing a first mechanical power;

a generator for converting said first mechanical power into a first electrical power;

control means operable by a driver of said vehicle to produce a power setting signal representative of a desired power;

a driving wheel;

motor means for supplying a second mechanical power to said driving wheel from a second electrical power, said motor means including an electric motor mechanically coupled to said driving wheel and a circuit for controlling said electric motor that is responsive to said power setting signal to regulate the value of said second mechanical power to the value of said desired power; and, regulating means responsive to said power setting signal to regulate the rotational speed of said fuel engine to the value at which said first mechanical power is at least substantially equal, firstly, to said desired power and, secondly, to a set fraction of the maximum mechanical power of said fuel engine, said regulating means including transfer means electrically coupled to said generator and to said motor means to produce said second electrical power from said first electrical power, wherein said regulating means includes means for producing a measurement signal representative of said rotational speed and means for supplying a comparison signal between said measurement signal and said power setting signal, wherein said transfer means is arranged to respond to said comparison signal to increase the braking torque exerted by said generator on said fuel engine when said measurement signal is greater than said power setting signal and to decrease said braking torque when said measurement signal is less than said power setting signal, and wherein said transfer means includes a first regulating element connected across a first terminal and a second terminal of said generator and a second regulating element connected across said first terminal of said generator and a terminal of said control circuit, said first regulating element being responsive to said comparison signal to connect said terminals of said generator when said measurement signal is greater than said power setting signal, and said second regulating element being responsive to said comparison signal to connect said first terminal of said generator and said terminal of said control circuit.

9. A vehicle according to claim 8, wherein said vehicle further comprises a device for supplying fuel to said fuel engine that is responsive to said comparison signal to regulate said first mechanical power to a value greater than that of said set fraction of said maximum mechanical power when said measurement signal is less than said power setting signal, to the value of said set fraction of said maximum mechanical power when said measurement signal is equal to said power setting signal, and to a value less than that of said set fraction of said maximum mechanical power when said measurement signal is greater than said power setting signal.

10. A vehicle according to claim 9, wherein said transfer means includes power supply means connected between said generator and said control circuit and responsive to said comparison signal for supplying to said control circuit an electrical power equal to said first electrical power when said measurement signal is greater than or equal to said power setting signal and for supplying to said control circuit an electrical power less than said first electrical power when said measurement signal is less than said power setting signal.

11. A vehicle according to claim 10 further comprising a rechargeable source of electrical energy arranged to supply to said control circuit an electrical power having a value equal to the difference between said desired power and the electrical power supplied by said power supply means.

12. A vehicle according to claim 8, wherein said transfer means includes power supply means connected between said generator and said control circuit and responsive to said comparison signal for supplying to said control circuit an electrical power equal to said first electrical power when said measurement signal is greater than or equal to said power setting signal and for supplying to said control circuit an electrical power less than said first electrical power when said measurement signal is less than said power setting signal.

13. A vehicle according to claim 12 further comprising a rechargeable source of electrical energy arranged to supply to said control circuit an electrical power having a value equal to the difference between said desired power and the electrical power supplied by said power supply means.

* * * * *